United States Patent [19]
Koyama et al.

[11] Patent Number: 5,990,979
[45] Date of Patent: Nov. 23, 1999

[54] GAMMA CORRECTION CIRCUIT AND VIDEO DISPLAY APPARATUS USING THE SAME

[75] Inventors: Fumio Koyama; Kiyoshi Miyashita, both of Suwa, Japan

[73] Assignee: Seiko Epson Corporation, Tokyo, Japan

[21] Appl. No.: 08/920,001

[22] Filed: Aug. 29, 1997

[30] Foreign Application Priority Data

Aug. 30, 1996 [JP] Japan ..................................... 8-248650

[51] Int. Cl.[6] .................................................. H04N 5/202
[52] U.S. Cl. .......................................... 348/674; 348/677
[58] Field of Search .................................... 348/254, 674, 348/675, 677; 358/519; H04N 6/69, 5/202

[56] References Cited

U.S. PATENT DOCUMENTS 5,610,666 3/1997 Ueda ....................................... 348/676

*Primary Examiner*—Sherrie Hsia
*Attorney, Agent, or Firm*—Oliff & Berridge, PLC

[57] ABSTRACT

A gamma correction circuit is provided for gamma correcting first and second polarity video signals of different polarity. The gamma correction circuit includes first and second resistance elements R1, R2 connected in series between a power supply terminal 50 and a ground terminal 52 and a third resistance element R3 connected in parallel with the first resistance element R1 between the power supply terminal 50 and the second resistance element R2. A fourth resistance element R4 is connected in parallel with the second resistance element R2 between the ground terminal 52 and the third resistance element R3. An output terminal 54 is arranged between the first and second resistance elements R1, R2. An input transistor Tr1 is connected between the first and second resistance elements R1, R2 with its base supplied with a video signal. A first control transistor is connected between the power supply terminal 50 and the third resistance element R3. The first control transistor Tr2 is turned on with its base supplied with a first reference voltage when a first polarity video signal is input, and remains turned off the rest of the time. A second control transistor Tr3 is connected between the ground terminal 52 and the fourth resistance element R4. The second control transistor Tr3 is turned on with its base supplied with a second reference voltage when a second polarity video signal is input and remains turned off the rest of the time.

15 Claims, 21 Drawing Sheets

FRAME 1

| V1+ | V2− | V3+ | V4− | V5+ | V6− | V1+ | V2− | ••• | V1+ | V2− |
|---|---|---|---|---|---|---|---|---|---|---|
| V2− | V3+ | V4− | V5+ | V6− | V1+ | V2− | V3+ | | V2− | V3+ |
| V3+ | V4− | V5+ | V6− | V1+ | V2− | V3+ | V4− | | V3+ | V4− |
| V4− | V5+ | V6− | V1+ | V2− | V3+ | V4− | V5+ | | V4− | V5+ |
| ⋮ | | | | | | | | | | |
| V6− | V1+ | V2− | V3+ | V4− | V5+ | V6− | V1+ | | V6− | V1+ |

FRAME 2

| V1− | V2+ | V3− | V4+ | V5− | V6+ | V1− | V2+ | ••• | V1− | V2+ |
|---|---|---|---|---|---|---|---|---|---|---|
| V2+ | V3− | V4+ | V5− | V6+ | V1− | V2+ | V3− | | V2+ | V3− |
| V3− | V4+ | V5− | V6+ | V1− | V2+ | V3− | V4+ | | V3− | V4+ |
| V4+ | V5− | V6+ | V1− | V2+ | V3− | V4+ | V5− | | V4+ | V3− |
| ⋮ | | | | | | | | | | |
| V6+ | V1− | V2+ | V3− | V4+ | V5− | V6+ | V1− | | V6+ | V1− |

FIG.10

FRAME 1

| V1+ | V2+ | V3+ | V4+ | V5+ | V6+ | V1+ | V2+ | ... | V1+ | V2+ |
|---|---|---|---|---|---|---|---|---|---|---|
| V2− | V3− | V4− | V5− | V6− | V1− | V2− | V3− | | | V2− | V3− |
| V3+ | V4+ | V5+ | V6+ | V1+ | V2+ | V3+ | V4+ | | V3+ | V4+ |
| V4− | V5− | V6− | V1− | V2− | V3− | V4− | V5− | | V4− | V5− |
| ⋮ | | | | | | | | | | |
| V6− | V1− | V2− | V3− | V4− | V5− | V6− | V1− | | V6− | V1− |

FRAME 2

| V1− | V2− | V3− | V4− | V5− | V6− | V1− | V2− | ... | V1− | V2− |
|---|---|---|---|---|---|---|---|---|---|---|
| V2+ | V3+ | V4+ | V5+ | V6+ | V1+ | V2+ | V3+ | | V2+ | V3+ |
| V3− | V4− | V5− | V6− | V1− | V2− | V3− | V4− | | V3− | V4− |
| V4+ | V5+ | V6+ | V1+ | V2+ | V3+ | V4+ | V5+ | | V4+ | V5+ |
| ⋮ | | | | | | | | | | |
| V6+ | V1+ | V2+ | V3+ | V4+ | V5+ | V6+ | V1+ | | V6+ | V1+ |

FIG.11

FRAME 1

| V1+ | V2+ | V3+ | V4+ | V5+ | V6+ | V1+ | V2+ | ••• | V1+ | V2+ |
|-----|-----|-----|-----|-----|-----|-----|-----|-----|-----|-----|
| V2+ | V3+ | V4+ | V5+ | V6+ | V1+ | V2+ | V3+ |     | V2+ | V3+ |
| V3+ | V4+ | V5+ | V6+ | V1+ | V2+ | V3+ | V4+ |     | V3+ | V4+ |
| V4+ | V5+ | V6+ | V1+ | V2+ | V3+ | V4+ | V5+ |     | V4+ | V5+ |
| ⋮   |     |     |     |     |     |     |     |     |     |     |
| V6+ | V1+ | V2+ | V3+ | V4+ | V5+ | V6+ | V1+ |     | V6+ | V1+ |

FRAME 2

| V1− | V2− | V3− | V4− | V5− | V6− | V1− | V2− | ••• | V1− | V2− |
|-----|-----|-----|-----|-----|-----|-----|-----|-----|-----|-----|
| V2− | V3− | V4− | V5− | V6− | V1− | V2− | V3− |     | V2− | V3− |
| V3− | V4− | V5− | V6− | V1− | V2− | V3− | V4− |     | V3− | V4− |
| V4− | V5− | V6− | V1− | V2− | V3− | V4− | V5− |     | V4− | V5− |
| ⋮   |     |     |     |     |     |     |     |     |     |     |
| V6− | V1− | V2− | V3− | V4− | V5− | V6− | V1− |     | V6− | V1− |

FIG.12

FRAME 1

| V1+ | V2− | V3+ | V4− | V5+ | V6− | V1+ | V2− | ... | V1+ | V2− |
|-----|-----|-----|-----|-----|-----|-----|-----|-----|-----|-----|
| V2− | V3+ | V4− | V5+ | V6− | V1+ | V2− | V3+ |     | V2− | V3+ |
| V3+ | V4− | V5+ | V6− | V1+ | V2− | V3+ | V4− |     | V3+ | V4− |
| V4− | V5+ | V6− | V1+ | V2− | V3+ | V4− | V5+ |     | V4− | V5+ |
| ⋮   |     |     |     |     |     |     |     |     |     |     |
| V6− | V1+ | V2− | V3+ | V4− | V5+ | V6− | V1+ |     | V6− | V1+ |

FRAME 2

| V2− | V3+ | V4− | V5+ | V6− | V1+ | V2− | V3+ | ... | V2− | V3+ |
|-----|-----|-----|-----|-----|-----|-----|-----|-----|-----|-----|
| V3+ | V4− | V5+ | V6− | V1+ | V2− | V3+ | V4− |     | V3+ | V4− |
| V4− | V5+ | V6− | V1+ | V2− | V3+ | V4− | V5+ |     | V4− | V5+ |
| V5+ | V6− | V1+ | V2− | V3+ | V4− | V5+ | V6− |     | V5+ | V6− |
| ⋮   |     |     |     |     |     |     |     |     |     |     |
| V6− | V1+ | V2− | V3+ | V4− | V5+ | V6− | V1− |     | V6− | V1− |

FIG. 13

FRAME 1

| a1+ | a2− | a3+ | a4− | a5+ | a6− | a7+ | a8− | ••• | $a_{k-1}$+ | $a_k$− |
|---|---|---|---|---|---|---|---|---|---|---|
| b1− | b2+ | b3− | b4+ | b5− | b6+ | b7− | b8+ | | $b_{k-1}$− | $b_k$+ |
| c1+ | c2− | c3+ | c4− | c5+ | c6− | c7+ | c8+ | | $c_{k-1}$+ | $c_k$− |
| d1− | d2+ | d3− | d4+ | d5− | d6+ | d7− | d8− | | $d_{k-1}$− | $d_k$+ |
| ⋮ | | | | | | | | | | |
| | | | | | | | | | | |

FRAME 2

| a1− | a2+ | a3− | a4+ | a5− | a6+ | a7+ | a8− | ••• | $a_{k-1}$− | $a_k$+ |
|---|---|---|---|---|---|---|---|---|---|---|
| b1+ | b2− | b3+ | b4− | b5+ | b6− | b7− | b8+ | | $b_{k-1}$+ | $b_k$− |
| c1− | c2+ | c3− | c4+ | c5− | c6+ | c7+ | c8− | | $c_{k-1}$− | $c_k$+ |
| d1+ | d2− | d3+ | d4− | d5+ | d6− | d7− | d8+ | | $d_{k-1}$+ | $d_k$− |
| ⋮ | | | | | | | | | | |
| | | | | | | | | | | |

FIG.14

FRAME 1

| a1+ | a2+ | a3+ | a4+ | a5+ | a6+ | a7+ | a8+ | ••• | $a_{k-1}+$ | $a_k+$ |
|---|---|---|---|---|---|---|---|---|---|---|
| b1− | b2− | b3− | b4− | b5− | b6− | b7− | b8− | | $b_{k-1}-$ | $b_k-$ |
| c1+ | c2+ | c3+ | c4+ | c5+ | c6+ | c7+ | c8+ | | $c_{k-1}+$ | $c_k+$ |
| d1− | d2− | d3− | d4− | d5− | d6− | d7− | d8− | | $d_{k-1}-$ | $d_k-$ |
| ⋮ | | | | | | | | | | |
| | | | | | | | | | | |

FRAME 2

| a1− | a2− | a3− | a4− | a5− | a6− | a7− | a8− | ••• | $a_{k-1}-$ | $a_k-$ |
|---|---|---|---|---|---|---|---|---|---|---|
| b1+ | b2+ | b3+ | b4+ | b5+ | b6+ | b7+ | b8+ | | $b_{k-1}+$ | $b_k+$ |
| c1− | c2− | c3− | c4− | c5− | c6− | c7− | c8− | | $c_{k-1}-$ | $c_k-$ |
| d1+ | d2+ | d3+ | d4+ | d5+ | d6+ | d7+ | d8+ | | $d_{k-1}-$ | $d_k-$ |
| ⋮ | | | | | | | | | | |
| | | | | | | | | | | |

FIG.15

FRAME 1

| $a_1+$ | $a_2+$ | $a_3+$ | $a_4+$ | $a_5+$ | $a_6+$ | $a_7+$ | $a_8+$ | ... | $a_{k-1}+$ | $a_k+$ |
|---|---|---|---|---|---|---|---|---|---|---|
| $b_1+$ | $b_2+$ | $b_3+$ | $b_4+$ | $b_5+$ | $b_6+$ | $b_7+$ | $b_8+$ | | $b_{k-1}+$ | $b_k+$ |
| $c_1+$ | $c_2+$ | $c_3+$ | $c_4+$ | $c_5+$ | $c_6+$ | $c_7+$ | $c_8+$ | | $c_{k-1}+$ | $c_k+$ |
| $d_1+$ | $d_2+$ | $d_3+$ | $d_4+$ | $d_5+$ | $d_6+$ | $d_7+$ | $d_8+$ | | $d_{k-1}+$ | $d_k+$ |
| ⋮ | | | | | | | | | | |
| | | | | | | | | | | |

FRAME 2

| $a_1-$ | $a_2-$ | $a_3-$ | $a_4-$ | $a_5-$ | $a_6-$ | $a_7-$ | $a_8-$ | ... | $a_{k-1}-$ | $a_k-$ |
|---|---|---|---|---|---|---|---|---|---|---|
| $b_1-$ | $b_2-$ | $b_3-$ | $b_4-$ | $b_5-$ | $b_6-$ | $b_7-$ | $b_8-$ | | $b_{k-1}-$ | $b_k-$ |
| $c_1-$ | $c_2-$ | $c_3-$ | $c_4-$ | $c_5-$ | $c_6-$ | $c_7-$ | $c_8-$ | | $c_{k-1}-$ | $c_k-$ |
| $d_1-$ | $d_2-$ | $d_3-$ | $d_4-$ | $d_5-$ | $d_6-$ | $d_7-$ | $d_8-$ | | $d_{k-1}-$ | $d_k-$ |
| ⋮ | | | | | | | | | | |
| | | | | | | | | | | |

GAMMA CORRECTION CIRCUIT AND VIDEO DISPLAY APPARATUS USING THE SAME

BACKGROUND OF THE INVENTION

1. Field of Invention

The present invention relates to a gamma correction circuit and a video display apparatus that gamma corrects a first polarity video signal and a second polarity video signal.

2. Description of Related Art

In a video display apparatus incorporating a liquid-crystal panel that includes a data driver IC and a scanning driver IC each constructed of thin-film transistors (TFTs) on a glass substrate, the operating speed of the data-line driving circuit and the scanning-line driving circuit is substantially lower than that of circuitry formed on a silicon substrate primarily because of the response of a liquid crystal crystalline of silicone. Therefore, it is required to match the frequency of a video signal to the operating speed on a sampling side.

It is contemplated that the pixel signal contained as serial data in the video signal is expanded in phase and video presentation is performed using the phase-expanded video signal. As shown in FIGS. 19A and 19B, the data processing circuit block 10 in the video display apparatus is connected to a phase expansion circuit 30 that expands an input video signal VIDEO to six phases and in response to a control signal from a timing circuit block 20, outputs panel driving video signals V(i) (i=1–6) from respective output terminals OUT 1–OUT 6 on a per phase basis. The panel driving video signals V(i) are respectively applied to data signal lines 112 by supplying lines 132 connected to sampling switches 134 in a liquid-crystal panel 110 that are connected to respective six pixels that are arranged in a horizontal direction. Since the panel driving video signals V(i) are those into which the input video signal VIDEO is six-phase-expanded by the phase expansion circuit 30, each panel driving video signal V(i) contains a pixel signal for every six pixels, and the frequency of the panel driving video signal V(i) becomes lower than that of the input video signal. VIDEO. For this reason, even if the operating speed for a data driver IC 130 and a scanning driver IC 120 each constructed of thin-film transistors is slow, the data driver IC 120 130 samples a pixel signal PD for each data signal line 112 at the sampling switches 134 out of the panel driving video signals V(1)–V(6) fed to terminals VIN1–VIN6, respectively, based on the sampling signal output from a shift register 136 for driving the sampling switches 134.

In the video display apparatus, an image of high image quality is presented if one-dot polarity reversal displaying is performed.

Conventionally, as shown in FIG. 20, a polarity reversal circuit 43 is arranged as a front stage prior to the phase expansion circuit 30. A signal output circuit 42 in the polarity reversal circuit 40 produces two types of video signals in reverse polarity from the input video signal VIDEO. Selectors 44a, 44b constructed of analog switches switch the polarity of the video signal applied to each sample/hold circuit within the phase expansion circuit 30. A gamma correction circuit (not shown) performs analog gamma correction and is conventionally arranged as a front stage prior to the polarity reversal circuit 40.

The conventional video display apparatus needs a large component count because it essentially requires that a signal is subjected to analog gamma correction prior to polarity reversal process, then separated through the polarity reversal circuit 40 into a positive polarity signal and a negative polarity signal, and then selected in a time-division manner by the analog switches.

SUMMARY OF THE INVENTION

It is an object of the present invention to provide a gamma correction circuit that performs gamma correction to signals of different polarities on a single signal line in considering each polarity.

It is another object to provide a video display apparatus that dispense with positive and negative analog amplifiers and analog switches by the use of a gamma correction circuit for gamma correcting signals of different polarities.

In a first aspect of the present invention, a gamma correction circuit receives a video signal including a first polarity video signal and a second polarity video signal of different polarities referenced to a polarity reversal reference voltage between first and second black level voltages and individually gamma corrects the first polarity video signal and the second polarity video signal. The first polarity video signal has a first signal voltage varying between a first white level voltage and the first black level voltage that is lower than the first white level voltage. The second polarity video signal has a second signal voltage varying between the second black level voltage and a second white level voltage that is lower than the second black level voltage.

A first amplifier device amplifies the first signal voltage at a first amplification factor when the first signal voltage of the first polarity video signal is higher than a first reference voltage between the first black level voltage and the first white level voltage.

A second amplifier device amplifies the first signal voltage at a second amplification factor that is greater than the first amplification factor when the first signal voltage of the first polarity video signal is lower than the first reference voltage.

A third amplifier device amplifies the second signal voltage at a third amplification factor when the second signal voltage of the second polarity video signal is lower than a second reference voltage between the second black level voltage and the second white level voltage.

A fourth amplifier device amplifies the second signal voltage at a fourth amplification factor that is smaller than the third amplification factor when the second signal voltage of the second polarity video signal is higher than the second reference voltage.

The amplification factors for the first and second signal voltages closer to the first and second black level voltages may be set higher in connection with each of the first and second polarity video signals. Therefore, gamma correction adapted to gradation correction is performed.

In a second aspect of the present invention, a gamma correction circuit receives a video signal including a first polarity video signal and a second polarity video signal of different polarities referenced to a polarity reversal reference voltage between first and second black level voltages and individually gamma corrects the first polarity video signal and the second polarity video signal. The first polarity video signal has a first signal voltage varying between a first white level voltage and the first black level voltage. The second polarity video signal has a second signal voltage varying between the second black level voltage and a second white level voltage.

A first voltage dividing device including resistance elements of a first number voltage divides a reference voltage by the resistance elements of the first number when the first signal voltage of the first polarity video signal is on one side of a first reference voltage between the first black level voltage and the first white level voltage and outputs an output voltage depending on the first signal voltage.

A second voltage dividing device including resistance elements of a second number greater than the first number voltage divides the reference voltage by the resistance elements of the second number when the first signal voltage of the first polarity video signal is on the other side of the first reference voltage and outputs an output voltage depending on the first signal voltage.

A third voltage dividing device includes resistance elements of a third number voltage divides the reference voltage by the resistance elements of the third number when the second signal voltage of the second polarity video signal is on one side of a second reference voltage between the second black level voltage and the second white level voltage and outputs an output voltage depending on the second signal voltage.

A fourth voltage dividing device includes resistance elements of a fourth number greater than the third number voltage divides the reference voltage by the resistance elements of the fourth number when the second signal voltage of the second polarity video signal is on the other side of the second reference voltage and outputs an output voltage depending on the second signal voltage.

The reference voltage may be voltage divided by different number of resistance elements in accordance with the magnitudes of the first and second signal voltages respectively referenced to the first and second reference voltages. Gamma correction may be performed to the first and second polarity video signals according to the magnitudes of the signal voltages.

In a third aspect of the present invention, the gamma correction circuit according to the second aspect includes the resistance elements of the first number that are commonly used as the resistance elements of the third number.

According to the third aspect, the first and third voltage dividing devices may share resistance elements.

In a fourth aspect of the present invention, a gamma correction circuit receives a video signal including a first polarity video signal and a second polarity video signal of different polarities referenced to a polarity reversal reference voltage between first and second black level voltages and individually gamma corrects the first polarity video signal and the second polarity video signal. The first polarity video signal has a first signal voltage varying between a first white level voltage and the first black level voltage. The second polarity video signal has a second signal voltage varying between the second black level voltage and a second white level voltage.

The game correction circuit includes a first terminal for applying a first voltage and a second terminal for applying a second voltage lower than the first voltage. A first resistance element and a second resistance element are connected in series between the first terminal and the second terminal. A third resistance element is connected in parallel with the first resistance element between the first terminal and the second resistance element. A fourth resistance element is connected in parallel with the second resistance element between the second terminal and the third resistance element. An output terminal is connected to an intermediate node between the first resistance element and the second resistance element. A first current control device causes a current to flow through the first and second resistance elements depending on the first signal voltage when the first signal voltage of the first polarity video signal is on one side of a first reference voltage between the first black level voltage and the first white level voltage. The first current control device causes currents to flow through the first, second and third resistance elements when the first signal voltage of the first polarity video signal is on the other side of the first reference voltage.

A second current control device causes a current to flow through the first and second resistance elements when the second signal voltage of the second polarity video signal is on one side of a second reference voltage between the second black level voltage and the second white level voltage. The second current control device causes currents to flow through the first, second and fourth resistance elements when the second signal voltage of the second polarity video signal is on the other side of the second reference voltage.

According to the fourth aspect, the number of resistance elements through which current flows is set to be different depending on the magnitudes of the first and second signal voltages referenced to the first and second reference voltages. Additionally, gamma correction is performed to each of the first and second polarity video signals according to the magnitudes of the signal voltages.

In a fifth aspect of the present invention, a gamma correction circuit receives a video signal including a first polarity video signal and a second polarity video signal of different polarities referenced to a polarity reversal reference voltage between first and second black level voltages and individually gamma corrects the first polarity video signal and the second polarity video signal. The first polarity video signal has a first signal voltage varying between a first white level voltage and the first black level voltage. The second polarity video signal has a second signal voltage varying between the second black level voltage and a second white level voltage.

The gamma correction circuit may include a first terminal to which a first voltage is applied and a second terminal to which a second voltage lower than the first voltage is applied. A first resistance element and a second resistance element may be connected in series between the first terminal and the second terminal. A third resistance element may be connected in parallel with the first resistance element between the first terminal and the second resistance element. A fourth resistance element may be connected in parallel with the second resistance element and may be connected between the second terminal and the third resistance element.

An output terminal may be connected to an intermediate node between the first resistance element and the second resistance element.

An input transistor may be connected between the first resistance element and the second resistance element with the video signal applied to a first control terminal.

A first control transistor may be connected between the first terminal and the third resistance element. The first control transistor may be turned on when a first reference voltage between the first black level voltage and the first white level voltage is applied to a second control terminal with the first polarity video signal applied to the first control terminal. The first control transistor may remain turned off the rest of time.

A second control transistor may be connected between the second terminal and the fourth resistance element. The second control transistor may be turned on when a second reference voltage between the second black level voltage and the second white level voltage is applied to a third control terminal with the second polarity video signal applied to the first control terminal. The second control transistor may remain turned off the rest of the time.

According to the sixth aspect of the present invention, in connection with the first and second polarity video signals, the applied voltages to the second and third control terminals of the first and second control transistors, respectively, are made different depending on magnitudes of the first and second signal voltages referenced to the first and second reference voltages. Thus, the voltage output at the output terminal is changed and gamma correction is performed to each of the first and second polarity video signals according to the magnitudes of the signal voltages.

In a sixth aspect, a video display apparatus is provided having a video display unit including pixels arranged in a matrix and electrically connected to a plurality of data-signal lines and a plurality of scan-signal lines.

A scan-signal line selecting device sequentially applies a scan signal to the scan-signal lines. Each pixel is supplied with the difference voltage between a voltage applied to one end of the pixel via the data-signal line and a voltage applied to the other end of the pixel and is driven with the direction of an electric field applied to the pixels.

The video display apparatus includes a polarity reversal circuit to which a video signal is applied having a signal voltage between a black level voltage and a white level voltage, outputs a signal including a first polarity video signal that has a first signal voltage varying between a first white level voltage and a first black level voltage and a second polarity video signal that has a second signal voltage varying between a second black level voltage and a second white level voltage with the first and second polarity video signals being different in polarity referenced to a polarity reversal reference voltage between the first and second black level voltages.

According to the sixth aspect, gamma correction is performed to each of the first and second polarity video signals with the polarity reversed thus not requiring any splitting into a plurality of channels according to polarity. Accordingly, analog switches are not required.

In a seventh aspect of the present invention, when the first polarity video signal is input, the first black level voltage is clamped to a first clamp voltage and when the second polarity video signal is input, the second black level voltage is clamped to a second clamp voltage.

According to the seventh aspect of the present invention, after each of the first and second polarity video signals with polarity reversed is subjected to gamma correction, the gamma corrected signals are clamped to different clamp voltages from polarity to polarity to properly set the first and second black level voltages.

Other objects, advantages and salient features of the invention will become apparent from the following description taken in conjunction with the annexed drawings, which disclose preferred embodiments of the invention.

BRIEF DESCRIPTION OF THE DRAWINGS

The invention will be described with reference to the following drawings in which like reference numerals refer to like elements and wherein:

FIG. 10 is a diagram showing the outputs of the sample/hold circuit of FIG. 5 that are reorganized in accordance with the positions of pixels during dot reversal driving;

FIG. 11 is a diagram showing the outputs of the sample/hold circuit of FIG. 5 that are reorganized in accordance with the positions of pixels during line reversal driving;

FIG. 12 is a diagram showing the outputs of the sample/hold circuit of FIG. 5 that are reorganized in accordance with the positions of pixels during frame reversal driving;

FIG. 13 is a diagram showing the outputs of the sample/hold circuit of FIG. 5 that are reorganized in accordance with the positions of pixels when the sample/hold circuit phase expands pixel data that are different at their header addresses from frame to frame;

FIG. 14 is a diagram showing the polarities of pixel data when dot reversal driving is performed in the manners shown in FIGS. 10 and 13;

FIG. 15 is a diagram showing the polarities of pixel data when line reversal driving is performed in the manner shown in FIG. 11;

FIG. 16 is a diagram showing the polarities of pixel data when frame reversal driving is performed in the manner shown in FIG. 12;

DETAILED DESCRIPTION OF PREFERRED EMBODIMENTS

Figure 1:
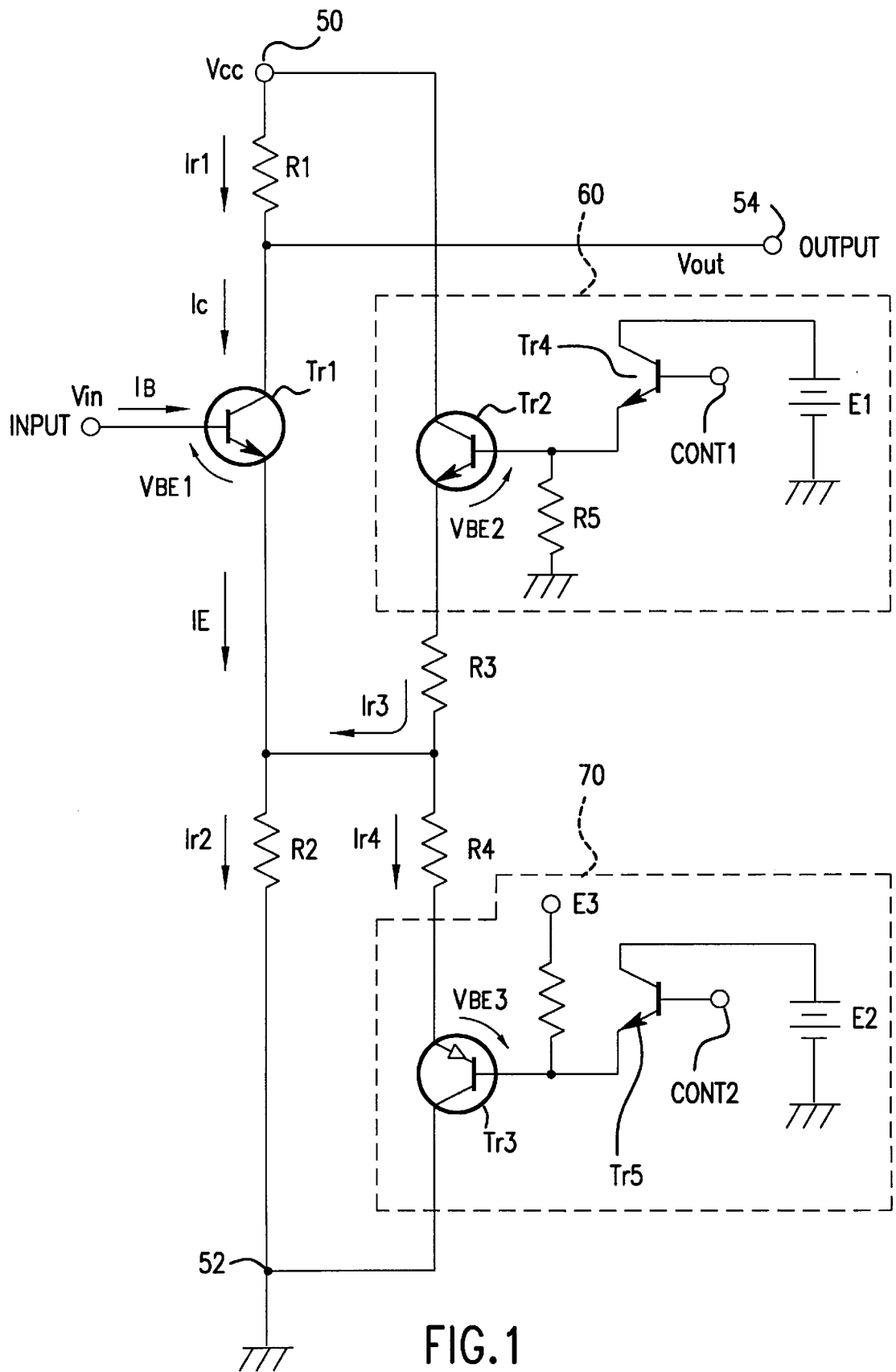
FIG. 1 is a diagram showing an exemplary gamma correction circuit of the present invention.

FIG. 1 is a diagram showing one embodiment of the gamma correction circuit of the present invention. As shown, a power supply voltage Vcc is applied as a first voltage to a power supply terminal 50 serving as a first terminal. A ground terminal 52 serving as a second terminal is grounded. A first resistance element R1 and a second resistance element R2 are connected in series between the power supply terminal 50 and the ground terminal 52. A third resistance R3 is connected in parallel with the first resistance element R1 and is connected between the power supply terminal 50 and the second resistance element R2. A fourth resistance element R4 is connected in parallel with the second resistance element R2 and is connected between the ground terminal 52 and the third resistance element R3.

An input transistor Tr1 is connected between the first resistance element R1 and the second resistance element R2. In particular, the collector of the input transistor Tr1 is connected to the first resistance element R1 and the emitter of the input transistor Tr1 is connected to the resistance element R2. The base of the input transistor Tr1 functions as an input terminal of the gamma correction circuit. A polarity reversed video signal is applied to the input terminal. The signal voltage of the video signal is designated Vin. The input transistor Tr1 is turned on with the signal voltage Vin applied to the base of the input transistor Tr1. The voltage between the base and emitter of the input transistor Tr1 is designated $V_{BE1}$.

An output terminal 54 of the gamma correction circuit is connected to the node of the first resistance element R1 and the collector of the input transistor Tr1.

Figure 2A:
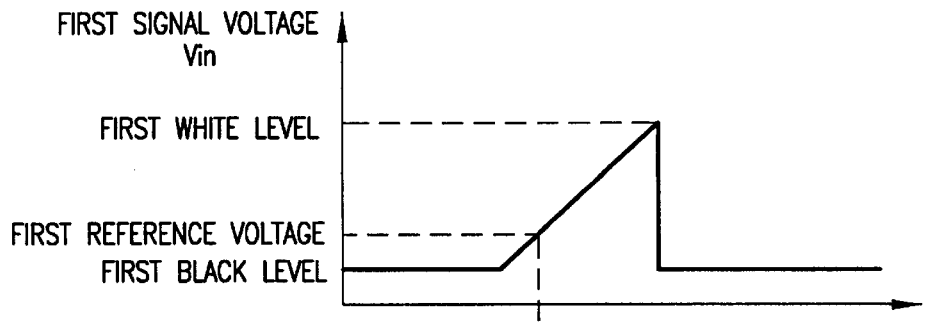
FIG. 2(A) shows a first polarity video signal.

The video signal input to the base of the input transistor Tr1 will be now discussed with reference to FIGS. 2A and 2C. FIGS. 2A and 2C show a first polarity video signal and a second polarity video signal, respectively. The first polarity video signal shown in FIG. 2A contains a first signal voltage Vin varying between a first black level voltage and a first white level voltage. On the other hand, the second polarity video signal shown in FIG. 2C contains a second signal voltage Vin varying between a second black level voltage and a second white level voltage.

Figure 2B:
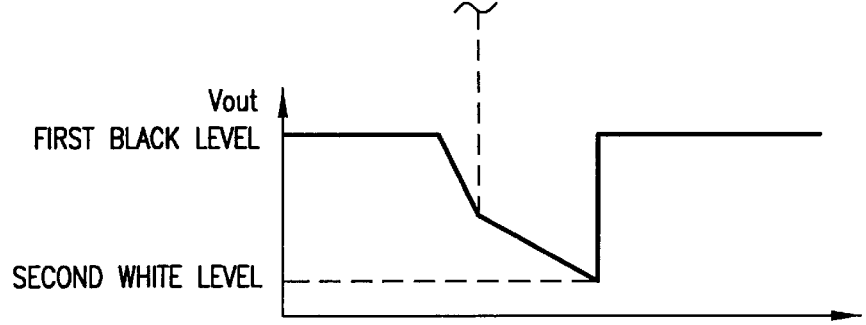
FIG. 2(B) shows output characteristics of the signal of FIG. 2(A) after gamma correction.
Figure 2C:
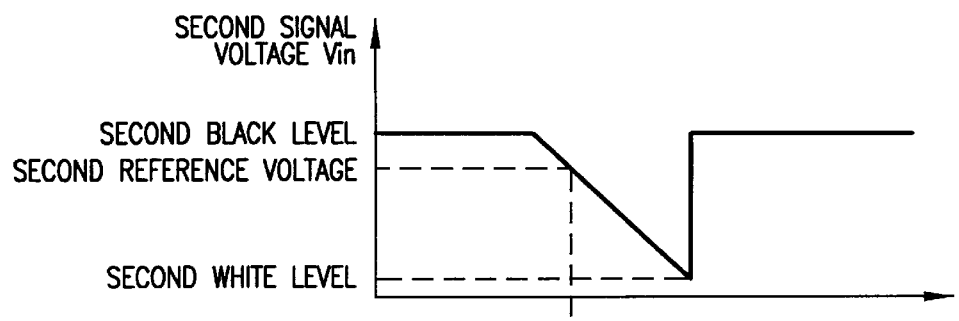
FIG. 2(C) shows a second polarity video signal.
Figure 2D:
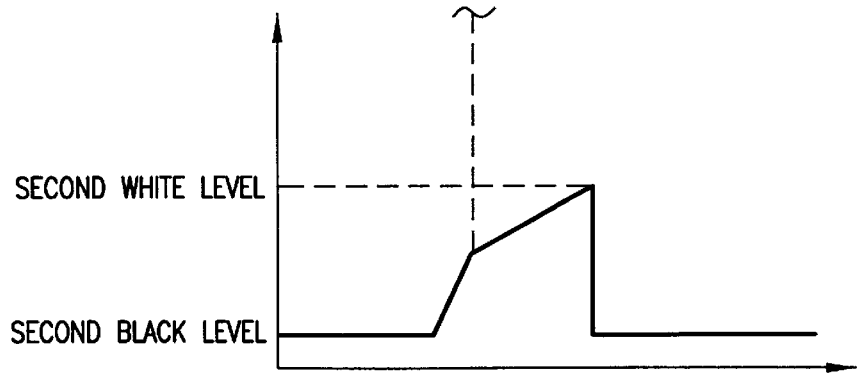
FIG. 2(D) shows output characteristics of the signal of FIG. 2(C) after gamma correction.

FIGS. 2B and 2D show preferred output characteristics after the first and second polarity video signals have been gamma corrected. By allowing the gamma correction circuit to correct the first and second polarity video signals, the first and second signal voltages are inverted and amplified. As shown in FIGS. 2B and 2D, an inverting amplification factor is set to be larger on a signal voltage region nearer to the black level voltage with respect to a first reference voltage or a second reference voltage than on the remaining signal voltage region. This gamma correction compensates for a reduction of tonal gradation arising from a steep rate of change near the black levels over the T-V curve that represents the characteristic of liquid crystal in the relationship of transmissivity (T) and applied voltage (V).

The gamma correction circuit shown in FIG. 1 carries out the gamma corrections shown in FIGS. 2B and 2D by controlling currents flowing through the first, second, third and fourth resistance elements R1–R4 using first and second current control devices 60, 70.

The first current control device 60 allows currents to flow through the first and second resistance elements R1, R2 depending on the first signal voltage when the first signal voltage of the first polarity video signal is higher than the first reference voltage. The first current control device allows currents to flow through the first, second and third resistance elements R1, R2 and R3 when the first signal voltage of the first polarity video signal is lower than the first reference voltage.

The second current control device 70 allows currents to flow through the first and second resistance elements R1 and R2 when the second signal voltage of the second polarity video signal is lower than the second reference voltage. The second current control device allows currents to flow through the first, second and fourth resistance elements R1, R2 and R4 when the second signal voltage of the second polarity video signal is higher than the second reference voltage.

The first current control device 60 includes a first control transistor Tr2 connected between the power supply terminal 50 and the third resistance element R3 (FIG. 1). The collector of the first control transistor Tr2 is connected to the power supply terminal 50 and the emitter is connected to the third resistance element R3. A first power supply voltage E1 is connected to the base of the first control transistor Tr2 through a first switching transistor Tr4. The base of the first control transistor Tr2 is grounded through a load resistance element R5. The base of the first switching transistor Tr4 is supplied with a first control signal CONT1. When the first polarity video signal is input, the first control signal CONT1 is driven to a logic "H" causing the first switching transistor Tr4 to turn on. If the load resistance element R5 is large enough, the first power supply voltage E1 is fed to the base of the first control transistor Tr2 thus turning it on. At this moment, the base-emitter voltage of the first control transistor Tr2 becomes $V_{BE2}$. Upon receiving a logic "L", the first switching transistor Tr4 is turned off. Since the base of the first control transistor Tr2 is grounded through the load resistance element R5, the first control transistor Tr2 is turned off.

In FIG. 1, the second current control device 70 includes a second control transistor Tr3 connected between the ground terminal 52 and the fourth resistance element R4. The collector of the second control transistor Tr3 is connected to the ground terminal 52 and the emitter is connected to the fourth resistance element R4. A second power supply voltage E2 is connected to the base of the second control transistor Tr3 through a second switching transistor Tr5. Furthermore, a third high power supply voltage E3 is fed to the base of the second control transistor Tr3 via a load resistance element R6. A second control signal CONT2 is input to the base of the second switching transistor Tr5. When the second polarity video signal is input, the second control signal CONT2 is driven to a logic "H" causing the second switching transistor Tr5 to turn on. If the load resistance element R6 is large enough, the second power supply voltage E2 is fed to the base of the second control transistor Tr3 to turn it on. At this moment, the base-emitter voltage of the second control transistor Tr3 becomes $V_{BE3}$. Upon receiving a logic "L", the second switching transistor Tr5 is turned off. In this case, the base of the second control transistor Tr3 is supplied with the high voltage E3 through the load resistance element R5 and the second control transistor Tr3 remains turned off regardless of the magnitude of the signal voltage Vin. For this reason, the high voltage E3 is set to be $E3 > Vin(max) - V_{BE1} - V_{BE3}$ where the maximum value of the signal voltage of the video signal is designated by Vin (max).

The operation of the gamma correction circuit shown in FIG. 1 will now be discussed in connection with the following four cases.

(1) Input of first polarity video signal $Vin \geq E1$.

In this condition, the first control CONT1 is at a logic "H" and the voltage E1 is fed to the base of the first control transistor Tr2 to turn it on. The second control signal CONT2 is driven to a logic "L" and the second control transistor Tr3 is turned off.

The voltage at one end of the third resistance element R3 is Vin−$V_{BE1}$, and the voltage at the other end is E1−$V_{BE2}$. Since Vin≧E1 and $V_{BE1}$ ≐ $V_{BE2}$ ≐ 0.7 V, the voltage Vin−$V_{BE1}$, at the one end of the third resistance element R3 is always higher than the voltage E1−$V_{BE2}$ at the other end. Since no backward current flows through the first control transistor Tr2, no current flows through the third resistance element R3.

Considering that the base current $I_B$ of the input transistor Tr1 is sufficiently small, collector current $I_c$ and emitter current $I_E$ of the input transistor Tr1 are expressed as follows.

$$I_E = (Vin - V_{BE1})/R2$$
$$Ic = I_E - I_B \doteq I_E$$

If Ir1 represents a current flowing through the first resistance element R1, then $V_{out}$ output from the output terminal 54 is expressed as follows.

$$V_{out} = Vcc - Ir1 \times R1 \doteq Vcc - I_E \times R1$$
$$= Vcc - (Vin - V_{BE1})R1/R2 \qquad (a)$$

(2) Input of first polarity video signal Vin<E1.

In this case, again, the first control transistor Tr2 is turned on and the second control transistor Tr3 is turned off in the same way as in case (1). However, since Vin<E1, the voltage E1−$V_{BE2}$ at the other end of the third resistance element R3 is always greater than Vin−$V_{BE1}$ at one end of the third resistance element R3. Unlike case (1), a current flows through the third resistance element R3.

If Ir3 represents the current flowing through the third resistance element R3, the current Ir2 flowing through the second resistance element R2 is expressed as follows.

$$Ir2 = I_E + Ir3 = (Vin - V_{BE1})/R2 \qquad (b)$$

On the other hand, considering that $V_{BE1}$ ≐ , $V_{BE2}$ ≐ 0.7 V, the current Ir3 flowing through the third resistance element R3 with its one and other end supplied with respective voltages is as follows.

$$Ir3 = [(E1 - V_{BE2}) - (Vin - V_{BE1})]/R3$$
$$\doteq (E1 - Vin)/R3 \qquad (c)$$

The following equation is derived from equations (b) and (c).

$$I_E \doteq [(Vin - V_{BE1})/R2] - [(E1 - Vin)/R3]$$

Since the current Ir1 flowing through the first resistance element R1 is Ir1 ≐ $I_C$ ≐ $I_E$, $V_{out}$ appearing at the output terminal 54 is $$V_{out} = Vcc - Ir1 \times R1 \doteq Vcc - I_C \times R1 \doteq Vcc - I_E \times R1$$
$$= Vcc - R1\{[(Vin - V_{BE1})/R2] - [(E1 - Vin)/R3]\}$$
$$= Vcc - \{[(Vin - V_{BE1})R1/R2] + [(E1 - Vin)R1/R3]\} \qquad (d)$$

Comparing equation (a) with equation (d), the output voltage is increased by the third term in equation (d). In this way, when the first polarity video signal shown in FIG. 2(A) is input, gamma correction featuring the characteristics shown in FIG. 2(B) is performed.

(3) Input of second polarity video signal Vin≦E2+$V_{BE1}$+$V_{BE3}$.

In this case, with the first control signal CONT1 at a logic "L", the first control transistor Tr2 is turned off. The second control signal CONT2 is at a logic "H" and the second control transistor Tr3 is turned on.

The voltage at one end of the fourth resistance element R4 is Vin−$V_{BE1}$, and the voltage at the other end of the fourth resistance element R4 is E2+$V_{BE3}$. Since Vin≦E2+$V_{BE1}$+$V_{BE3}$, the voltage E2+$V_{BE3}$ at the other end of the fourth resistance element R4 is always higher than the voltage Vin−$V_{BE1}$ at the one end of the fourth resistance element R4. Since no backward current flows through the second control transistor Tr3, no current flows through the fourth resistance element R4 either.

Considering that base current $I_B$ is small enough, the collector current $I_C$ and emitter current $I_E$ of the input transistor Tr1 are expressed as follows.

$$I_E = (Vin - V_{BE1})/R2$$
$$I_C = I_E - I_B \doteq I_E$$

If Ir1 represent current flowing through the first resistance element R1, then $V_{out}$ output from the output terminal 54 is expressed as follows.

$$V_{out} = Vcc - Ir1 \times R1 \doteq Vcc - I_E \times R1$$
$$= Vcc - (Vin - V_{BE1})R1/R2 \qquad (e)$$

Equation (e) is identical to equation (a) in case (1).

(4) Input of second polarity video signal Vin>E2+$V_{BE1}$+$V_{BE3}$.

In this case, again, the first control transistor Tr2 is turned off, and the second control transistor Tr3 is turned on in the same way as in case (3). However, since Vin>E2+$V_{BE1}$+$V_{BE3}$, the voltage Vin−$V_{BE1}$ at one end of the fourth resistance element R4 is always higher than the voltage E2+$V_{BE3}$ at the other end of the fourth resistance element R4. Unlike case (3), a current flows through the fourth resistance element R4.

If Ir4 represents current flowing through the fourth resistance element R4, then the current Ir2 flowing through the second resistance element R2 is expressed as follows.

$$Ir2 = I_E + Ir4 = (Vin - V_{BE1})/R2 \qquad (f)$$

On the other hand, the current Ir4 flowing through the third resistance element R4 with its one and other end supplied with respective voltages is as follows.

$$Ir4 = [(Vin - V_{BE1}) - (E2 + V_{BE3})]/R4$$
$$= [Vin - E2 - (V_{BE1} + V_{BE3})]/R4 \qquad (g)$$

The following equation is derived from equations (f) and (g).

$$I_E = (Vin - V_{BE1})/R2 + [Vin - E2 - (V_{BE1} + V_{BE3})]/R4$$

Since the current Ir1 flowing through the first resistance element R1 is Ir1 ≐ $I_C$ ≐ $I_E$, $V_{out}$ appearing at the output terminal 54 is $$V_{out} = Vcc - Ir1 \times R1 \doteq Vcc - I_C \times R1 \doteq Vcc - I_E \times R1$$
$$= Vcc - R1[(Vin - V_{BE1})/R2 + \{Vin - E2 - (V_{BE1} + V_{BE3})\}/R4]$$
$$= Vcc - (Vin - V_{BE1})R1/R2 - [Vin - E2 - (V_{BE1} + V_{BE3})]R1/R4 \qquad (h)$$

Comparing equation (e) with equation (h), the output voltage is decreased by the third term in equation (h). In this way, when the first polarity video signal shown in FIG. 2(C) is input, gamma correction featuring the characteristics shown in FIG. 2(D) is performed.

The correction described in case (1) is performed when the first signal voltage Vin of the first polarity video signal is on one side of (e.g., higher than) the first reference voltage E1, and the first signal Vin is amplified at a first amplification factor defined in equation (a).

The correction described in case (2) is performed when the first signal voltage Vin of the first polarity video signal is on the other side of (e.g., lower than) the first reference voltage E1, and the first signal voltage Vin is amplified at a second amplification factor defined in equation (d), which is greater than the first amplification factor defined in equation (a).

The correction described in case (3) is performed when the second signal voltage Vin of the second polarity video signal is on one side of (e.g., lower than) the second reference voltage ($E2+V_{BE1}+V_{BE3}$), and the second signal voltage Vin is amplified at a third amplification factor defined in equation (e). The first amplification factor in case (1) is equal to the third amplification factor in case (3).

The correction described in case (4) is performed when the second signal voltage Vin of the second polarity video signal is on the other side of (e.g., higher than) the second reference voltage ($E2+V_{BE1}+V_{BE3}$), and the second signal voltage Vin is amplified at a fourth amplification factor defined in equation (h) that is smaller than the third amplification factor.

The correction described in case (1) is performed by the first voltage dividing device that includes resistance elements of a first number (i.e., two resistance elements of first and second resistance elements R1 and R2), voltage divides a reference voltage Vcc by the resistance elements of the first number when the first signal voltage Vin of the first polarity video signal is on one side of (e.g., higher than) the first reference voltage E1 and outputs an output voltage depending on the first signal voltage Vin.

The correction described in case (2) is performed by the second voltage dividing device which includes resistance elements of a second number greater than the first number (i.e., three resistance elements of the first, second and third resistance elements R1 through R3), voltage divides the reference voltage Vcc by the resistance elements of the second number when the first signal voltage Vin of the first polarity video signal is on the other side of (e.g., lower than the first reference voltage E1), and outputs an output voltage depending on the first signal voltage Vin.

The correction described in case (3) is performed by the third voltage dividing device that includes resistance elements of a third number (i.e., two resistance elements of the first and second resistance elements R1 and R2), voltage divides the reference voltage Vcc by the resistance elements of the third number when the second signal voltage Vin of the second polarity video signal is on one side of (e.g., lower than a second reference voltage ($E2+V_{BE1}+V_{BE3}$)), and outputs an output voltage depending on the second signal voltage Vin.

The correction described in case (4) is performed by the fourth voltage dividing device that includes resistance elements of a fourth number greater than the third number (e.g., three resistance elements of the first, second and fourth resistance elements R1, R2 and R4), voltage divides the reference voltage Vcc by the resistance elements of the fourth number when the second signal voltage Vin of the second polarity video signal is on the other side of (i.e., higher than the second reference voltage ($E2+V_{BE1}+V_{BE3}$)), and outputs a output voltage depending on the second signal voltage Vin.

Figure 3:
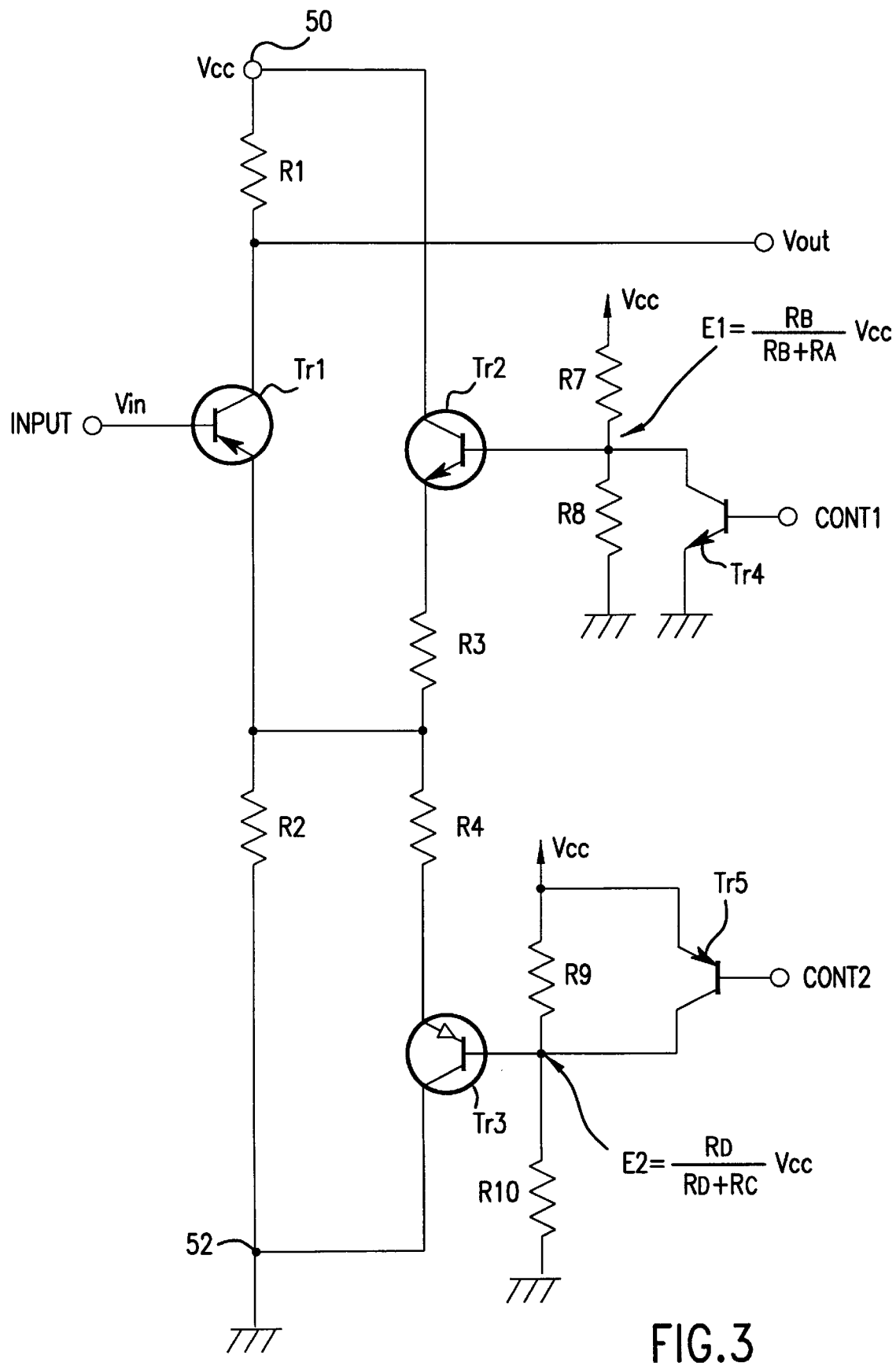
FIG. 3 is a diagram showing another exemplary gamma correction circuit of the present invention.

The gamma correction circuit may be embodied in another embodiment as shown in FIG. 3.

The gamma correction circuit shown in FIG. 3 includes the collector of the first switching transistor Tr4 supplied with a voltage into which the power supply voltage Vcc is voltage divided by load resistance elements R7, R8. Unlike the circuit shown in FIG. 1, when the first polarity video signal is corrected, a logic "L" is applied to the base of the first switching transistor Tr4 to turn the first switching transistor Tr4 off. Then, Vcc×R8/(R7+R8) is applied to the base of the first control transistor Tr2 to turn the first control transistor Tr2 on. Considering that the first reference voltage E1=Vcc×R8/(R7+R8), the gamma correction circuit in FIG. 3 corrects the first polarity video signal in a similar manner to the FIG. 1 gamma correction circuit.

The gamma correction circuit shown in FIG. 3 includes a p-type transistor as the second switching transistor Tr5 with its collector supplied with a voltage into which the power supply voltage Vcc is divided by load resistance elements R9, R10 and with its emitter supplied with the power supply voltage Vcc. To correct the second polarity video signal, a logic "H" is applied to the base of the second switching transistor Tr5 to turn the second switching transistor Tr5 off. Vcc×R10/(R9+R10) is applied to the base of the second control transistor Tr3 to turn the second control transistor Tr3 on. Considering that the second reference voltage is E2=Vcc×R10/(R9+R10), the FIG. 3 gamma correction circuit corrects the second polarity video signal in a similar manner to the FIG. 1 gamma correction circuit.

Figure 4:
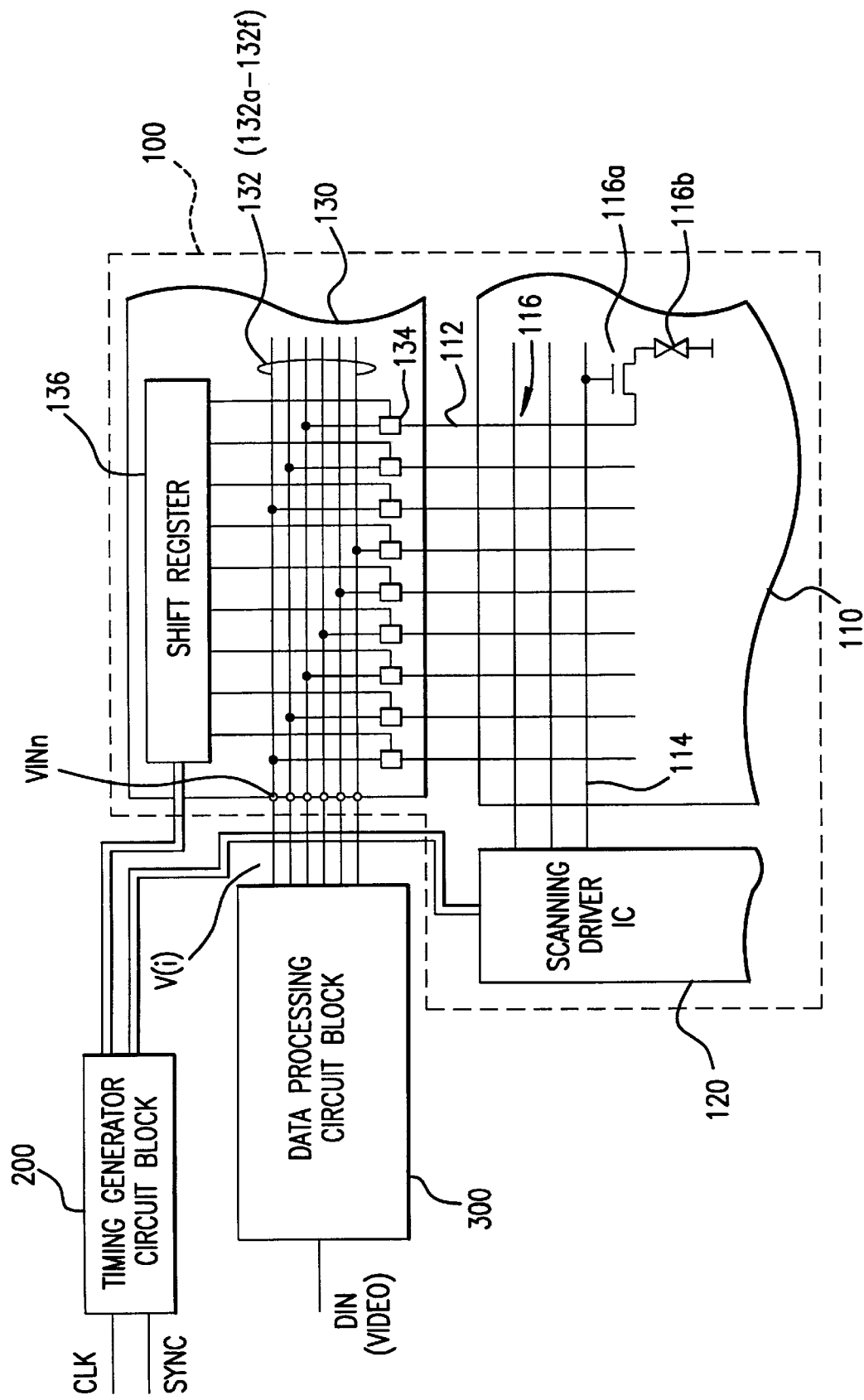
FIG. 4 is a block diagram of a video display apparatus into which the present invention is embodied.

FIG. 4 shows another embodiment of the video display apparatus incorporating the gamma correction circuits in FIGS. 1 and 3. FIG. 4 is a block diagram of the video display apparatus into which the present invention is embodied.

As shown in FIG. 4, the video display apparatus is of a type that employs an active matrix type liquid-crystal panel 110 and generally includes a liquid-crystal panel block 100, a timing generator circuit block 200 and a data processing circuit block 300.

The liquid-crystal block 100 includes the liquid-crystal panel 110, a scanning driver IC 120 as a scan-signal line selecting device, and a data driver IC 130 as a signal supplying device on the same glass substitute.

The liquid-crystal panel 110 includes pixels 116 arranged in a matrix and electrically connected to a plurality of data-signal lines 112 and a plurality of scan-signal lines 114. Each pixel 116 is constructed of a switching element such as a thin-film transistor (TFT) 116a and a liquid-crystal layer 116b. The switching element 116a is not limited to the TFT representative of triode elements. Alternatively, a metal layer-insulating layer-metal layer (MIM) element representative of diode elements may be used. When the present invention is used to drive a liquid-crystal panel, the liquid-crystal panel is not limited to the active matrix type. Passive matrix type liquid-crystal panels are acceptable and thus switching elements 116a are not necessarily used.

The scanning driver IC 120 feeds a scan signal to the scan signal lines 114 that sequentially selects switching elements 116a connected to the respective scan-signal lines 114.

The data driver IC 130 may include six signal supplying lines 132, a plurality of sampling switches 134 connected between the six signal supplying lines 132 and a plurality of data-signal lines 112, a shift register 136 for outputting timing signals that determine sampling timings to the plurality of sampling switches 134.

The timing generator circuit block 200 feeds a variety of timing signals to the liquid-crystal panel block 100 and the data processing circuit block 300.

Figure 5:
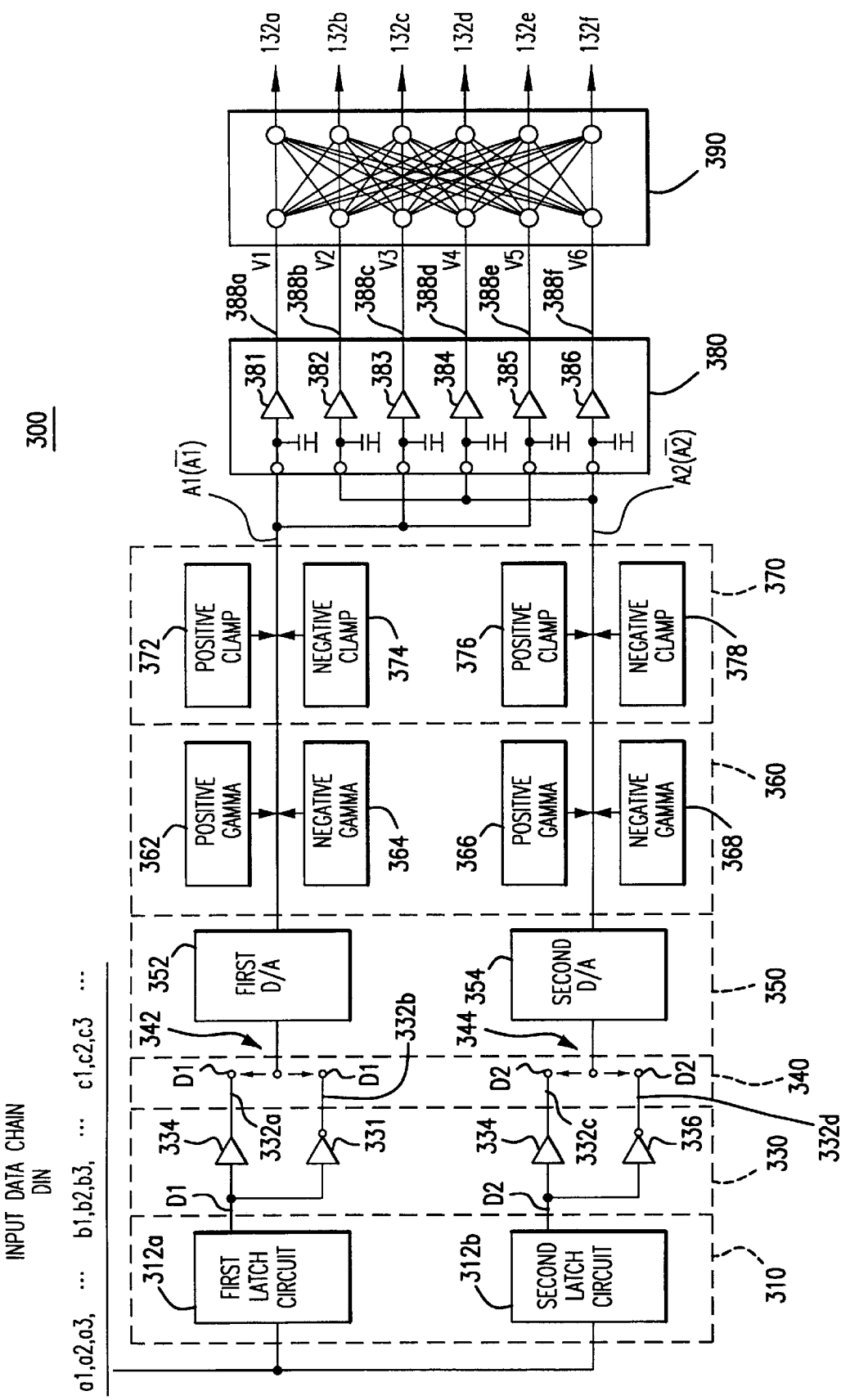
FIG. 5 is a detailed block diagram of the data processing circuit block in the video display apparatus of FIG. 4.

As shown in FIG. 5, the data processing circuit block 300 generally includes a first phase expansion circuit 310, a branching circuit 330, a selecting circuit 340, a digital-to-analog converter 350, a gamma correction circuit 360, a clamp circuit 370, a second phase expansion circuit 380 and a connection switching circuit (rotation circuit) 390.

The data processing circuit block 300 will now be discussed along with the description of its operation.

The first phase expansion circuit 310 receives digital pixel data a1, a2, a3, . . . to be applied to pixels 116 connected to a first row scan-signal line. Then digital pixel data b1, b2, b3, . . . are applied to pixels 116 connected to a second row scan-signal line.

Figure 6A:
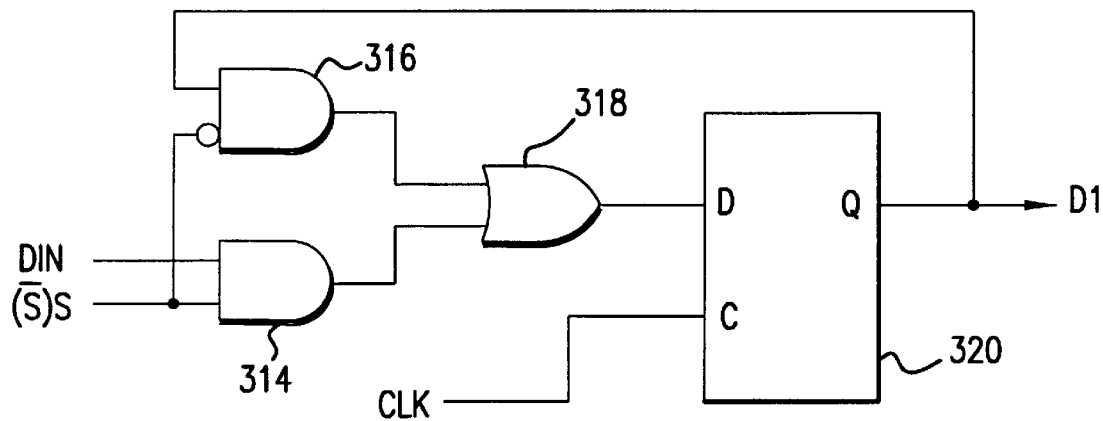
FIGS. 6(A) and 6(B) show the first and second latch circuits of FIG. 5.
Figure 6B:
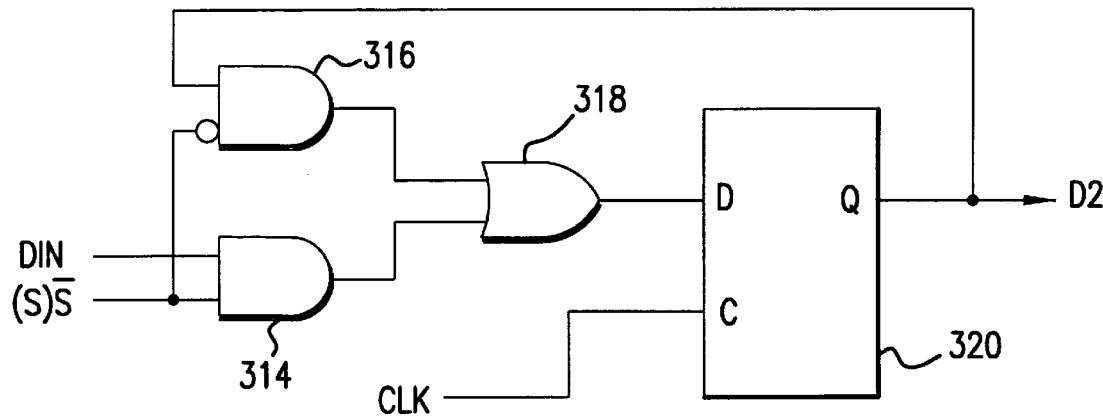

The first phase expansion circuit 310 includes a first latch circuit 312a and a second latch circuit 312b, to which these digital pixel data are input. The first and second latch circuits 312a, 312b are identical in construction as shown in FIGS. 6(A) and 6(B) and each includes first and second AND gates 314, 316, an OR gate 318 and a flipflop 320.

Each of the first AND gates 314 of the first and second latch circuits 312a, 312b receives the above-described digital pixel data DIN, and a clock S (e.g., 20 MHz) into which a reference clock CLK (e.g., 40 MHz) is frequency-divided, or inverted clock /S from the timing generator circuit block 200. In accordance with a horizontal synchronization timing and/or a vertical synchronization timing, the timing generator circuit block 200 switches the destinations of the divided clock S and inverted divided clock /S in a manner such that the inverted divided clock /S is applied to the second latch circuit 312b when the divided clock S is applied to the first latch circuit 312a. In this sense, the timing generator circuit block 200 functions as a modifying device for modifying phase expansion order in the first phase expansion circuit 310.

The OR gate 318 receives the outputs of the first and second AND gates 314, 316 and gives its output to a D terminal of the flipflop 320. The flipflop 320 receives the reference clock CLK at its clock terminal C. The reference clock 200, the divided clock S and the inverted divided clock /S are all supplied by the timing generator circuit block 200.

Figure 7:
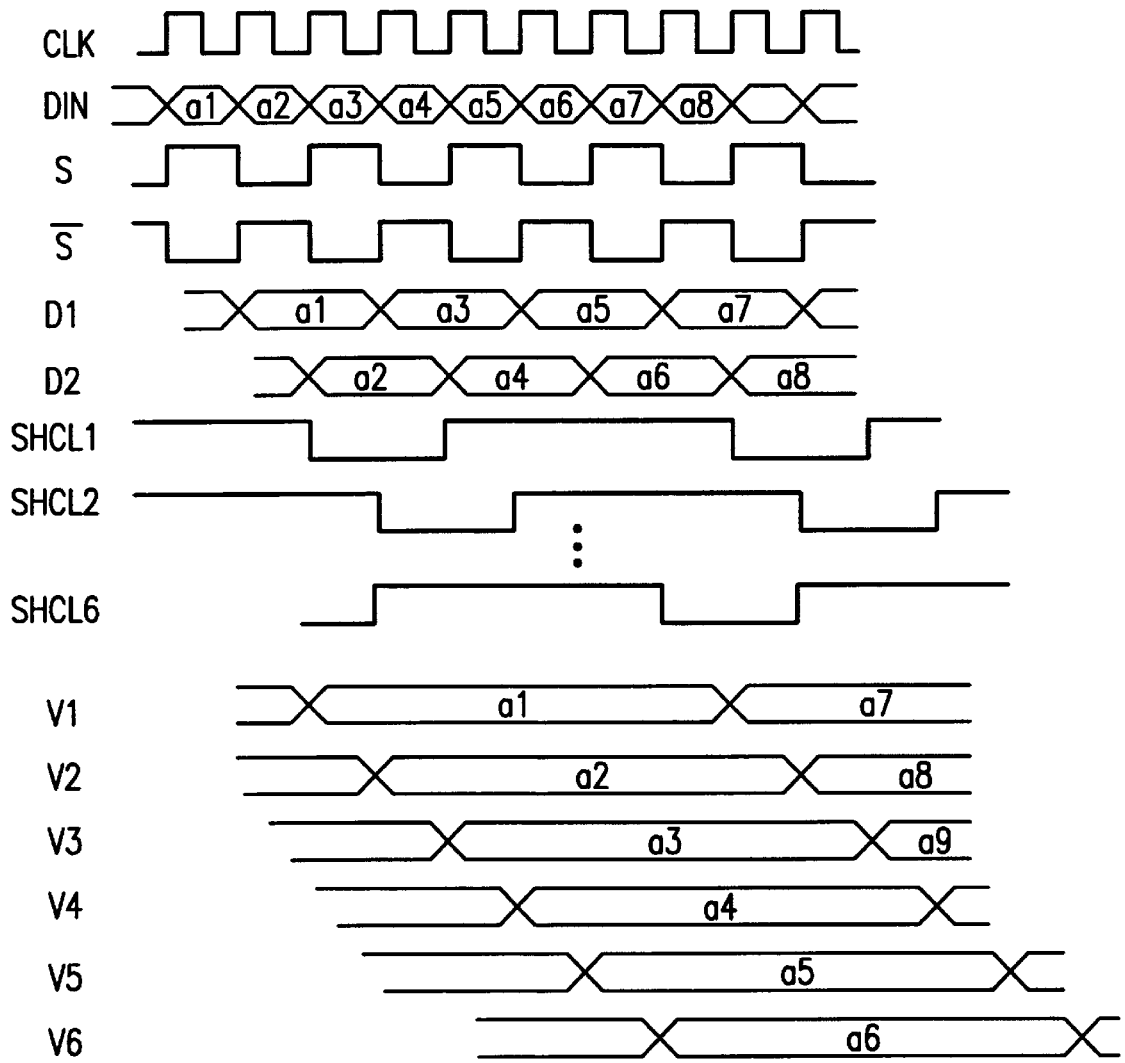
FIG. 7 is a timing diagram illustrating data expansion performed in the first and second phase expansion circuits of FIG. 5.

As shown in FIG. 7, when receiving the divided clock S, the first latch circuit 312a latches data a1 at a falling edge of the divided clock S. Since the output of the second AND gate 314 is driven high at the moment the divided clock S is transitioned to a low level, data a1 is continuously output at a Q output. This condition continues until data a3 is latched at a next falling edge of the divided clock S. Therefore, the first latch circuit 312a latches data a1, a3, a5, . . . so that the data is extended in time-length of data to be twice as long as their original lengths. The output signal from the first latch circuit 312a is designated a digital phase-expanded signal D1. In the second latch circuit 312b to which the inverted divided clock /S is applied, data a2, a4, a6,. . . are latched as shown in FIG. 7 and then again their time-lengths of data are extended to be twice as long as their original lengths. The second latch circuit 312b provides an output signal with a delay of one period of the reference clock CLK (half period of the divided clock S). The output signal from the second latch circuit 312b is designated a digital phase-expanded signal D2. In this way, the first phase expansion circuit 310 phase expands the input digital video data DIN into two digital phase-expanded signals D1, D2 having time-length of data extended.

As shown in FIG. 5, the branching circuit 330 includes first and second branch lines 332a, 332b to which the digital phase-expanded signal D1 is applied and third and fourth branch lines 332c, 332d to which the digital phase-expanded signal D2 is applied. The first and third branch lines 332a, 332c are connected to buffers 334 that directly output the digital phase-expanded signals D1, D2. The second and fourth branch lines 332b, 332d are connected to inverters 336, which output the digital phase-expanded signals D1, D2 of reverse polarity.

In the context of this specification, the meaning of the reverse polarity of the digital signal is twofold. First, the logic of each digital value is reversed; for example, 2-bit data (11) is converted to (00). Second, the 2s complement of a binary digital value is obtained; for example, 2-bit data (11) is converted to (01). The polarity of the voltage applied to the pixel 116 is reversed in relation to the scan signal. In this case, one polarity is designated a first polarity (e.g., a positive polarity) and the other polarity is designated a second polarity (e.g., a negative polarity). To reverse the polarity of the voltage applied to the pixel 116, the voltage of the data signal is changed to reverse its polarity relative to the voltage of the opposing (common) electrodes if the switching element 116a is constructed of a TFT. If the switching element 116a is constructed of an MIM, the voltage of the scan signal is changed to reverse its polarity relative to the intermediate voltage of the data signal.

Therefore, the digital phase-expanded signal D1 is output from the first branch line 332a, a reversed signal /D1 of the digital phase-expanded signal D1 is output from the second branch line 332b, the digital phase-expanded signal D2 is output from the third branch line 332c, and a reversed signal /D2 of the digital phase-expanded signal D2 is output from the fourth branch line 332d.

The selecting circuit 340 includes a first digital switch 342 that is connected to either the first branch line 332a or the second branch line 332b and a second digital switch 344 that is connected to either the third branch line 332c or the fourth branch line 332d.

The digital-to-analog converter 350 includes a first digital-to-analog converter circuit 352 for digital-to-analog converting the digital phase-expanded signal D1 or /D1 input through the first digital switch 342, and a second digital-to-analog converter circuit 354 for digital-to-analog converting the digital phase-expanded signal D2 or /D2 input through the second digital switch 344. Since the first and second digital-to-analog converter circuits 352, 354 sample data at the timing of the divided clock S for digital-to-analog conversion, compact and low-cost design is maintained. The output of the first digital-to-analog converter circuit 352 is designated a first phase-expanded analog signal A1 (or /A1) while the output of the second digital-to-analog converter circuit 354 is designated a second phase-expanded analog signal A2 (or /A2). The first and second phase-expanded analog signals A1 and A2 correspond to the first polarity video signal shown in FIG. 2(A) and the second polarity video signal shown in FIG. 2(C), respectively.

The gamma correction circuit 360 and the clamp circuit 370 are connected to each output line of the first and second digital-to-analog converter circuits 352, 354. In the gamma correction circuit 360, both a first positive polarity gamma correction circuit 362 and a first negative polarity gamma correction circuit 364 are connected to the output line of the first digital-to-analog converter circuit 352. The gamma correction circuit shown in FIG. 1 or FIG. 3 can play a dual role as both the first positive polarity and negative polarity gamma correction circuits 362, 364. A second positive polarity gamma correction circuit 366 and a second negative polarity gamma correction circuit 368 are connected to the output line of the second digital-to-analog converter circuit 354. The gamma correction circuit shown in FIG. 1 or FIG. 3 can play a dual role as both the second positive polarity and negative polarity gamma correction circuits 366, 368. In the clamp circuit 372, a first positive polarity clamp circuit 372 and a first negative polarity clamp circuit 374 are connected to the output line of the first digital-to-analog converter circuit 352. A second positive polarity clamp circuit 376 and a second negative polarity clamp circuit 378 are connected to the output line of the second digital-to-analog converter circuit 354. These first and second, positive, negative polarity clamps circuits 372–378 will be described below.

The second phase expansion circuit 380 includes six sample/hold circuits, namely first through sixth sample/hold circuits 381–386. The first phase-expanded analog signal A1 (or /A1) from the first digital-to-analog circuit 352 is always applied to odd-numbered sample/hold circuits 381, 383 and 385 in the second phase expansion circuit 380. The second phase-expanded analog signal A2 (or /A2) from the second digital-to-analog circuit 354 is always applied to even-numbered sample/hold circuits 382, 384 and 386 in the second phase expansion circuit 380. As shown in FIG. 7, the first through sixth sample/hold circuits 381–386 receive sampling clocks SHCL1–SHCL6 that determine the order of phase expansion, and thus the first phase-expanded analog signal is further expanded into N phases, typically three phases. The original digital video data DIN is already phase-expanded by the first phase expansion circuit 310 into n phases (e.g., two phases here). When the second phase expansion circuit 380 three-phase-expands them further, the original digital video data DIN is six-phase-expanded into six phase-expanded signals. The time-length of data of the phase-expanded signal at each phase from the second phase expansion circuit 380 is six times as long as the original digital video data DIN.

Figure 9:
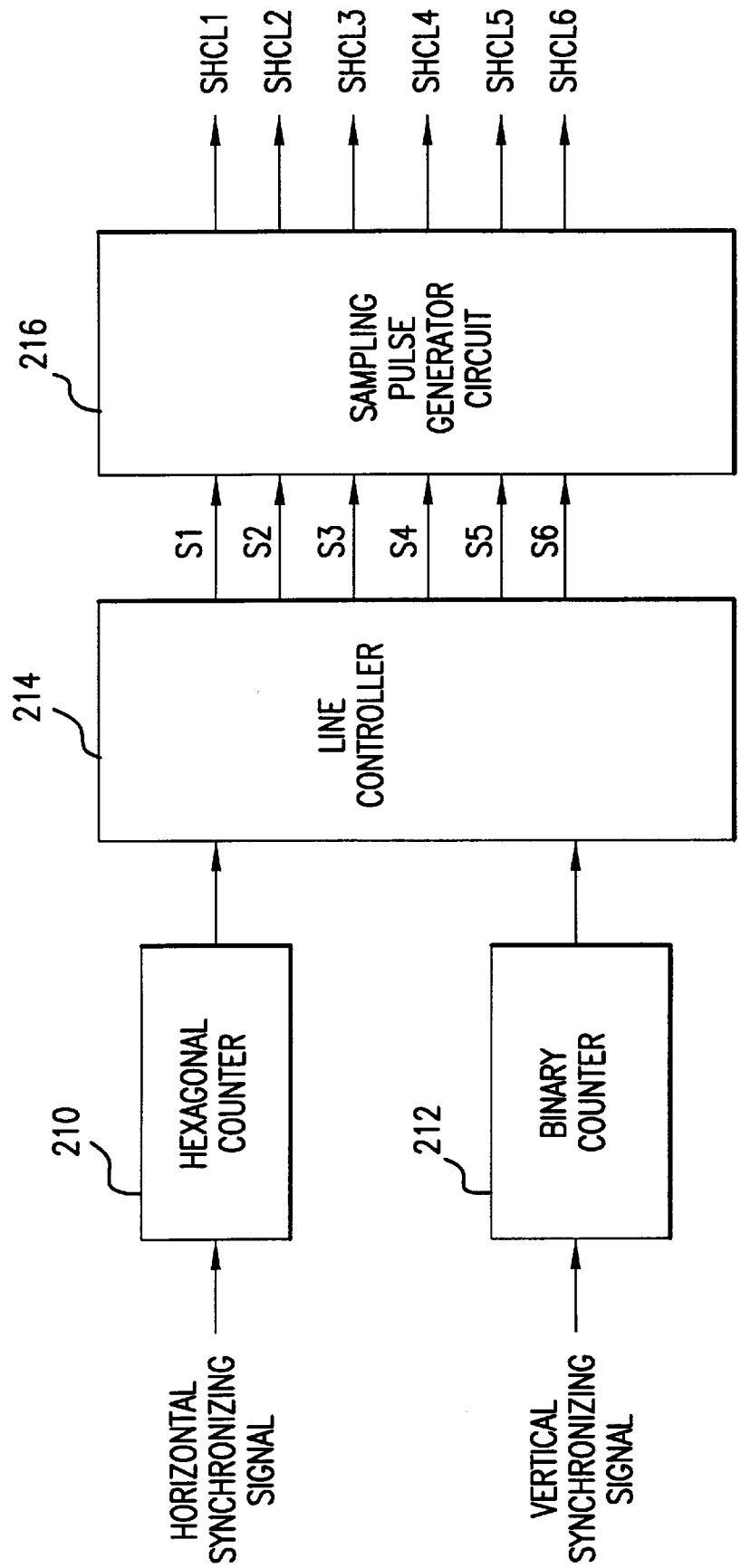
FIG. 9 is a block diagram showing the timing generator circuit block of FIG. 5.

As shown in FIG. 7, there are six sampling clocks SHCL1–SHCL6 that are generated by the timing generator circuit block 20C in response to select signals S1–S6. This apparatus switches the supply of the six sampling clocks SHCL1–SHCL6 based on the horizontal synchronization and vertical synchronization of the liquid-crystal panel 110. As shown in FIG. 9, the timing generator circuit block 200 has a hexagonal counter 210 and a binary counter 212. The hexagonal counter 210 counts a horizontal synchronizing signal while the binary counter 212 counts a vertical synchronizing signal. A line controller 214 receives the outputs from both counters 210, 212 switches and sequentially outputs the select signals S1–S6 each time the hexagonal counter 210 counts, in other words, for each horizontal scan (1H) at the moment a new scan-signal line 114 (FIG. 1) is selected. Furthermore, the line controller 214 switches the order of the outputting the select signals S1–S6 each time the binary counter 212 counts, in other words, for each vertical scan (1V) at the moment one frame driving of the liquid-crystal panel 110 (FIG. 4) is completed. For example, the line controller 214 may start with S1 at a first frame while starting with S2 at a second frame. The six types of sampling clocks SHCL1–SHCL6 are generated in a sampling pulse generator circuit 216 to which the select signals S1–S6 are applied. The timing generator circuit block 200 includes a circuit (not shown) that determines in response to the select signals S1–S6 which clock, divided clock S or inverted divided clock /S, to apply to the first or second latch circuits 312a, 312b in the first phase expansion circuit 310.

Outputs from the phase-expanded signal output lines 388a–388f of the first through sixth sample/hold circuits 381–386 are designated V1–V6, respectively. If the outputs V1–V6 are arranged in alignment with the positions of pixels, four driving methods are considered as shown in FIGS. 10 through 13.

Referring to FIG. 10, in frames 1 and 2, the sampling order is switched with S1 at a first line, S2 at a second line, S3 at a third line, . . . and S6 at a sixth line. These are repeated on further lines. If the number of lines per frame is a multiple of six, which is the number of expansion, the frame 2 is identical to the frame 1. Regardless of whether the number of lines per frame is a multiple of six, the frames 1 and 2 become identical in the order of phase expansion if the sampling is reset at the end of each frame.

Plus (+) and minus (−) signs shown in FIG. 10 indicate the polarities of data sampled and held, and dot reversal driving is made possible as shown in FIG. 7 by allowing the signal from the timing generator circuit block 200 to control the first and second digital switches 342, 344. FIG. 14 is created if pixel data is substituted in FIG. 10.

Referring to FIGS. 11 and 12, the sampling order remains unchanged from that in FIG. 10, but the selection by the first and second digital switches 342, 344 is changed. FIG. 11 shows the line reversal driving and FIG. 15 is created if pixel data is substituted. FIG. 12 shows the frame reversal driving and FIG. 16 is created if pixel data is substituted.

FIG. 13 shows the sampling order with the most excellent display characteristic where the frame 1 remains the same as that in FIG. 10 while the frame 2 is different from that in FIG. 10. As shown in FIG. 13, the sampling order at the first line in the frame 2 is made different from that in the frame 1 so that the first line in the frame 2 is identical to the second line in the frame 1. More particularly, the order of phase expansion is modified starting with the select signal S1 in the frame 1 while the order of phase expansion is modified starting with the select signal S2. This process results in the dot reversal driving shown in FIG. 14 where image data is substituted.

Figure 8:
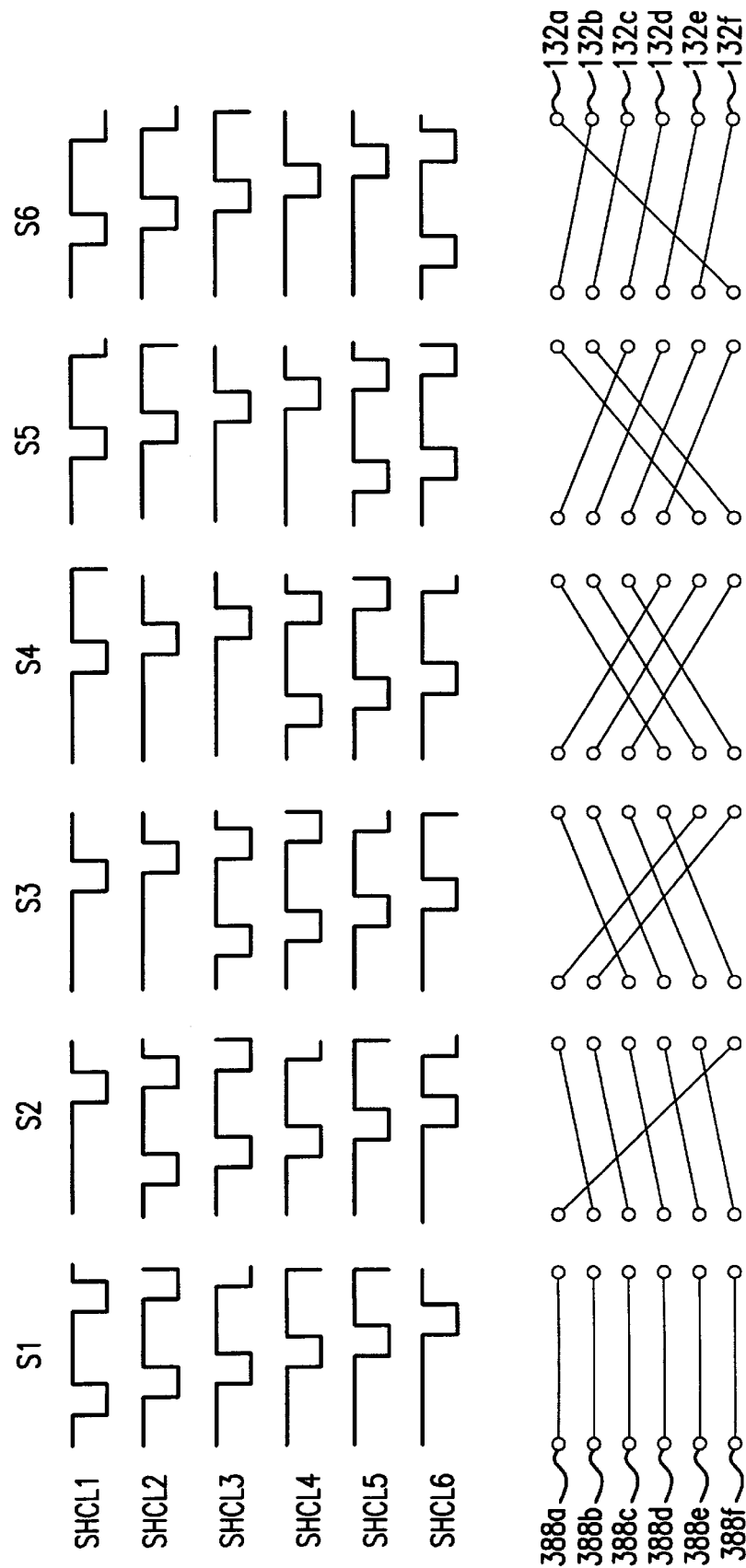
FIG. 8 is a diagram showing types of sampling signals input to the second phase expansion circuit of FIG. 5 and line connection statuses that are switched by a connection switching circuit in accordance with the types of the sampling signals.

The connection switching circuit (rotation circuit) 390 switches the connection between the six phase-expanded signal output lines 388a–388f and six signal supplying lines 132a–132f so that the pixel data is supplied as shown in FIGS. 14 through 16. The switching of this connection must be performed in synchronization with the switching of phase expansion order performed in the first and second phase expansion circuits 310, 380, and the phase expansion order is selected from among six types shown in FIG. 8 based on the signal from the timing generator circuit block 200. With such switching, the dot reversal driving, line reversal driving and frame reversal driving shown in FIGS. 14–16, respectively, are performed. From the standpoint of the life of liquid crystal, the dot reversal driving in FIG. 14 outperforms the others.

In any of the above driving processes, even if the amplifiers of the first through sixth sample/hold circuits 381–386 suffer variations in gain with one particular amplifier with a higher gain, the liquid-crystal panel 110 is free from brighter pixels consecutively aligned in a vertical line unlike the conventional apparatus, and instead, brighter pixels are diagonally scattered making themselves less visible. In particular, the switching method shown in FIG. 13 presents better image quality because the sampling order is modified from frame to frame to modify the positions of brighter pixels.

Figure 17:
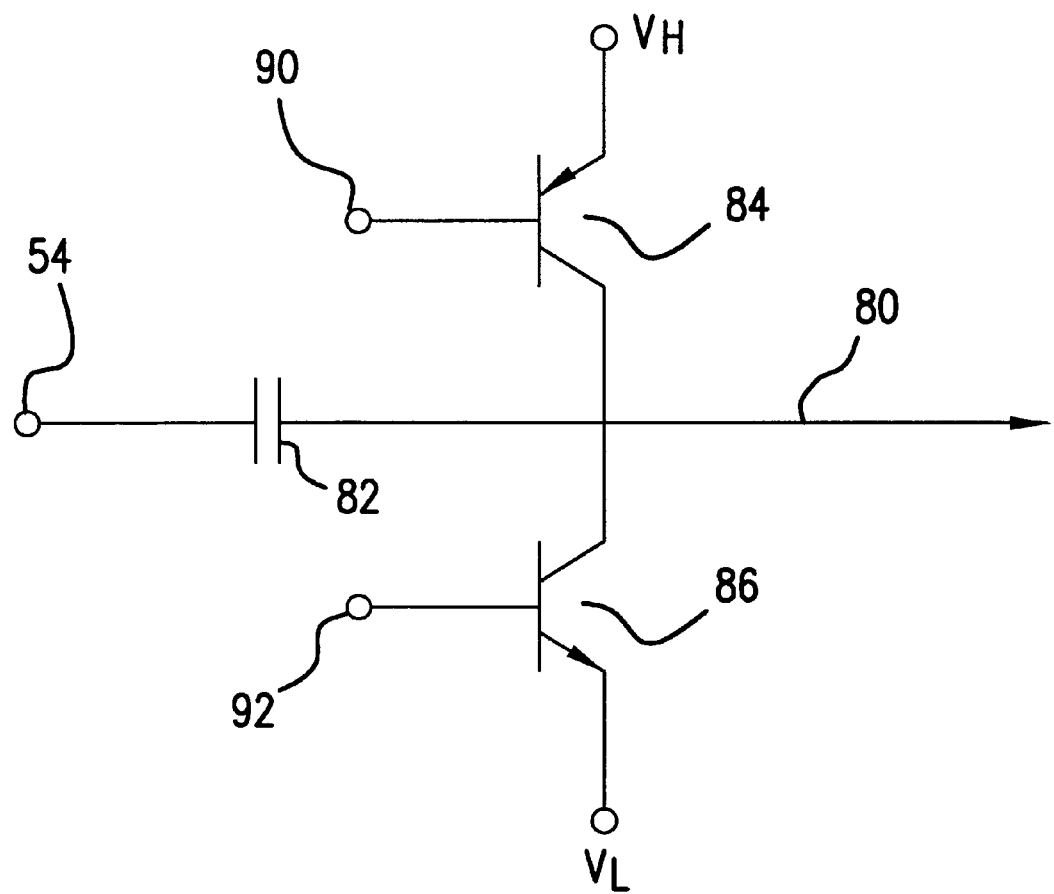
FIG. 17 is a diagram showing an exemplary clamp circuit that functions as both a positive polarity clamp circuit and a negative polarity clamp circuit shown in FIG. 5.

The first and second, positive polarity, negative polarity clamp circuits 372–378 will now be discussed with reference to FIG. 17. The clamp circuit shown in FIG. 17 works as both the first positive polarity and negative polarity clamp circuits 372, 374, and also as the second positive polarity and negative polarity clamp circuits 376, 378.

A capacitor 82 to be charged is connected to the input of a signal line 80 and first and second charging transistors 84, 86 are then connected to the signal line 80. The emitter of the first charging transistor 84 is supplied with a first clamp voltage $V_H$, and the collector of the first charging capacitor 84 is connected to the signal line 80. A positive clamp control signal 90 is applied to the base of the first charging transistor 84. The emitter of the second charging transistor 86 is supplied with a second clamp voltage $V_L$ which is lower than the first clamp voltage $V_H$, and the collector of the second charging transistor 86 is connected to the signal line 80. A negative clamp control signal 92 is applied to the base of the second charging transistor 86.

Operation of the clamp circuit will now be discussed. The signal line 80 of the clamp circuit may be connected to the output terminal 54 of the gamma correction circuit shown in FIG. 1. In this case, the clamp circuit is supplied with a signal that is obtained by gamma correcting the first polarity (positive) video signal shown in FIG. 2(A) and with a signal that is obtained by gamma correcting the second polarity (negative) video signal shown in FIG. 2(C). The positive clamp control signal 90 is a vertical retrace period or horizontal retrace period prior to the input of the positive polarity video signal after gamma correction and is transitioned to a logic "L" while a first black level voltage is input to the signal line 80. Then, the first charging transistor 84 is turned on, charging the capacitor 82 with the positive clamp voltage $V_H$. Later at the moment the positive clamp control signal 90 is transitioned to a logic "H", the first charging transistor 84 is turned off. When a positive polarity video signal is applied to the signal line 80, the first black level voltage is clamped to the positive clamp voltage $V_H$.

The negative clamp control signal 92 is a vertical retrace period or horizontal retrace period prior to the input of the negative polarity video signal after gamma correction and is transitioned to a logic "H" while a second black level voltage is input to the signal line 80. Then, the first charging transistor 86 is turned on, charging the capacitor 82 with the negative clamp voltage $V_L$. At the moment the negative clamp control signal 92 is transitioned to a logic "L", the second charging transistor 86 is turned off. When a negative polarity video signal is applied to the signal line 80, the second black level voltage is clamped to the negative clamp voltage $V_L$.

When the circuit shown in FIG. 5 is employed, the dot reversal driving shown in FIG. 10 or the frame reversal driving shown in FIG. 12 is performed, the positive and negative clamp control signals 90, 92 may be designed to turn on the first and second charging transistors 84, 86 during the vertical retrace period. More specifically, the data chain of V1, V3, V5, . . . passing through the positive polarity clamp circuit 372 and the negative polarity clamp circuit 374 and then output from the second phase expansion circuit 380 shown in FIG. 5 are always positive in polarity for the frame 1, and always negative in polarity for the frame 2 as shown in FIGS. 10 and 12 and no change in polarity takes place within each frame period.

In contrast, when the line reversal driving shown in FIG. 11 is performed, the positive and negative clamp control signals 90, 92 are required to turn on the first and second charging transistors 84, 86 during the horizontal retrace period. This is because the data chain V1, V3, V5, . . . change in polarity from line to line within each of the frames 1 and 2 as shown in FIG. 11.

Figure 18:
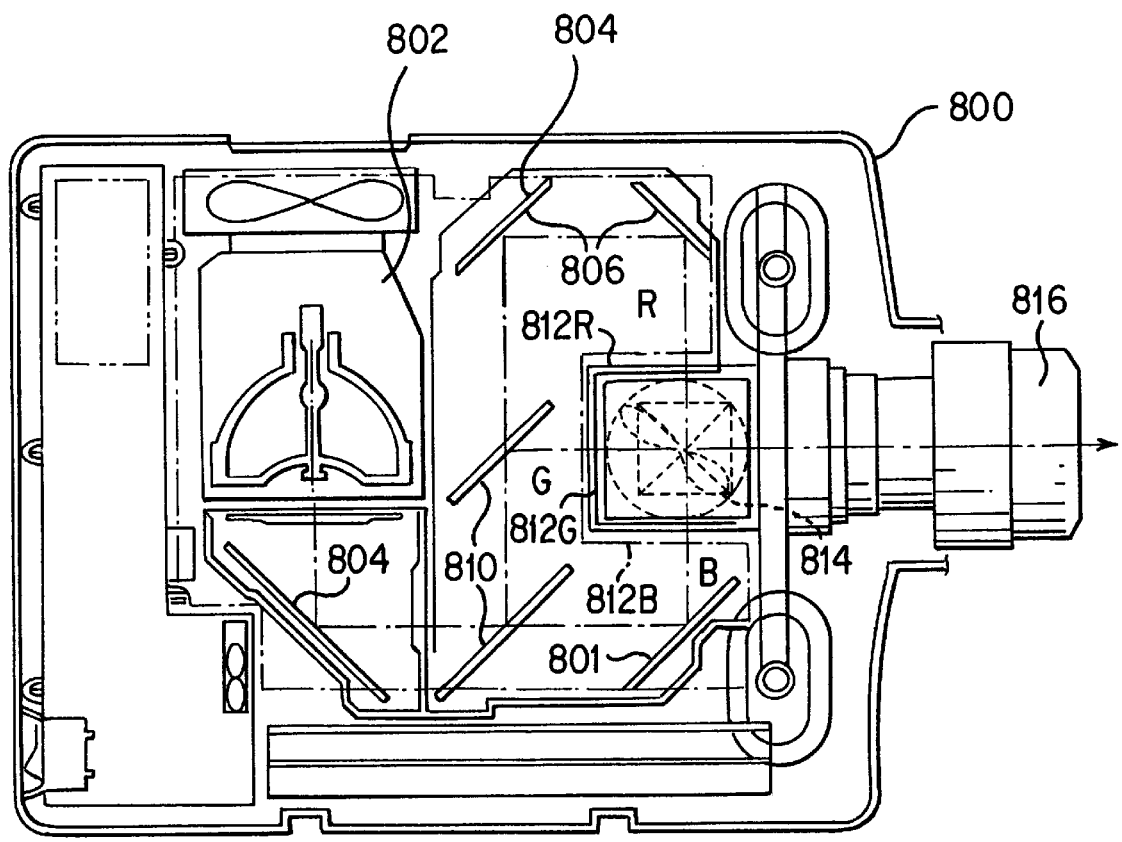
FIG. 18 is a diagram showing a projection type video display apparatus into which the present invention may be embodied.
Figure 19A:
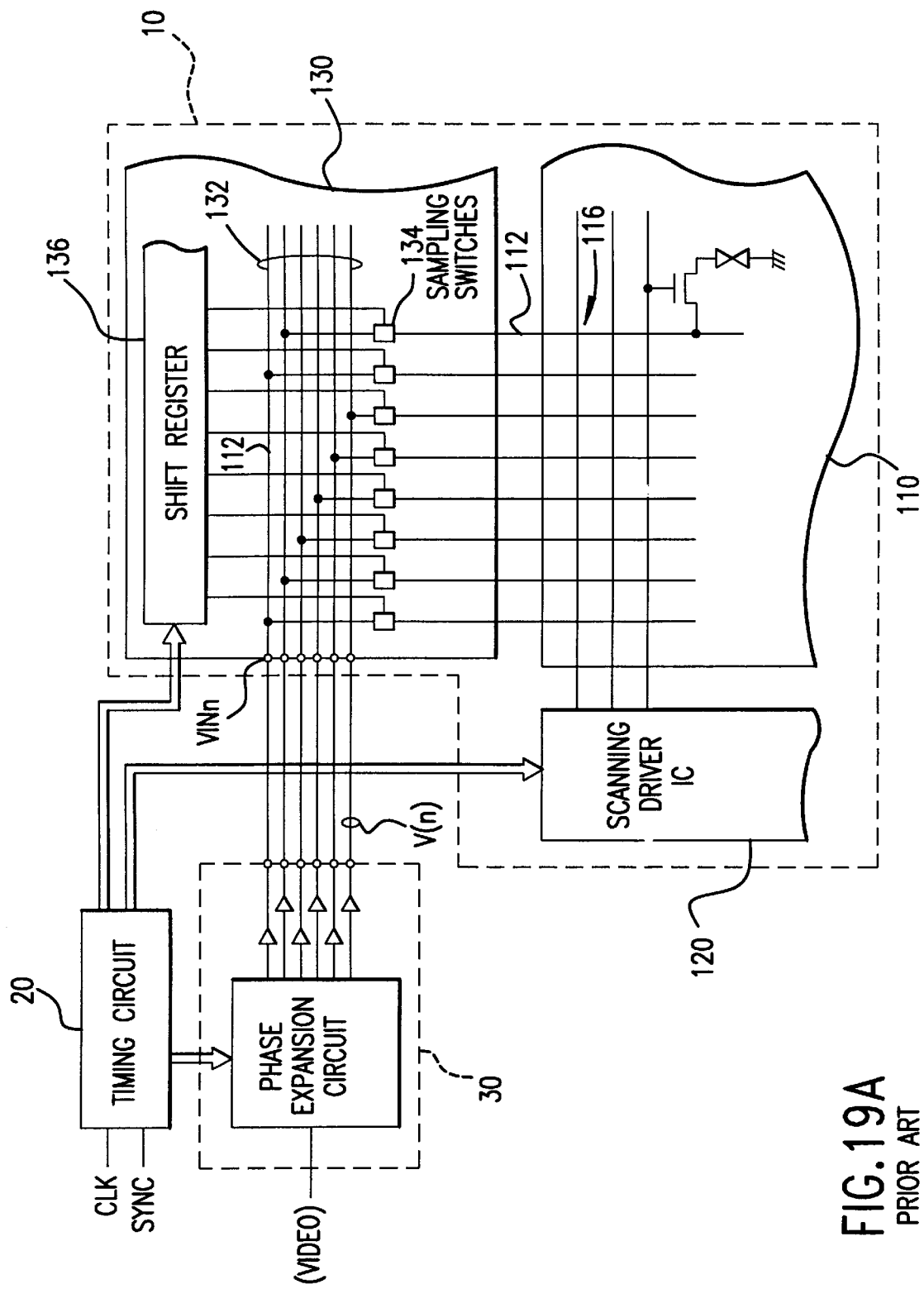
FIG. 19(A) is a block diagram showing a conventional video image apparatus that performs phase expansion and FIG. 19(B) is a timing diagram of the operation by the apparatus.
Figure 19B:
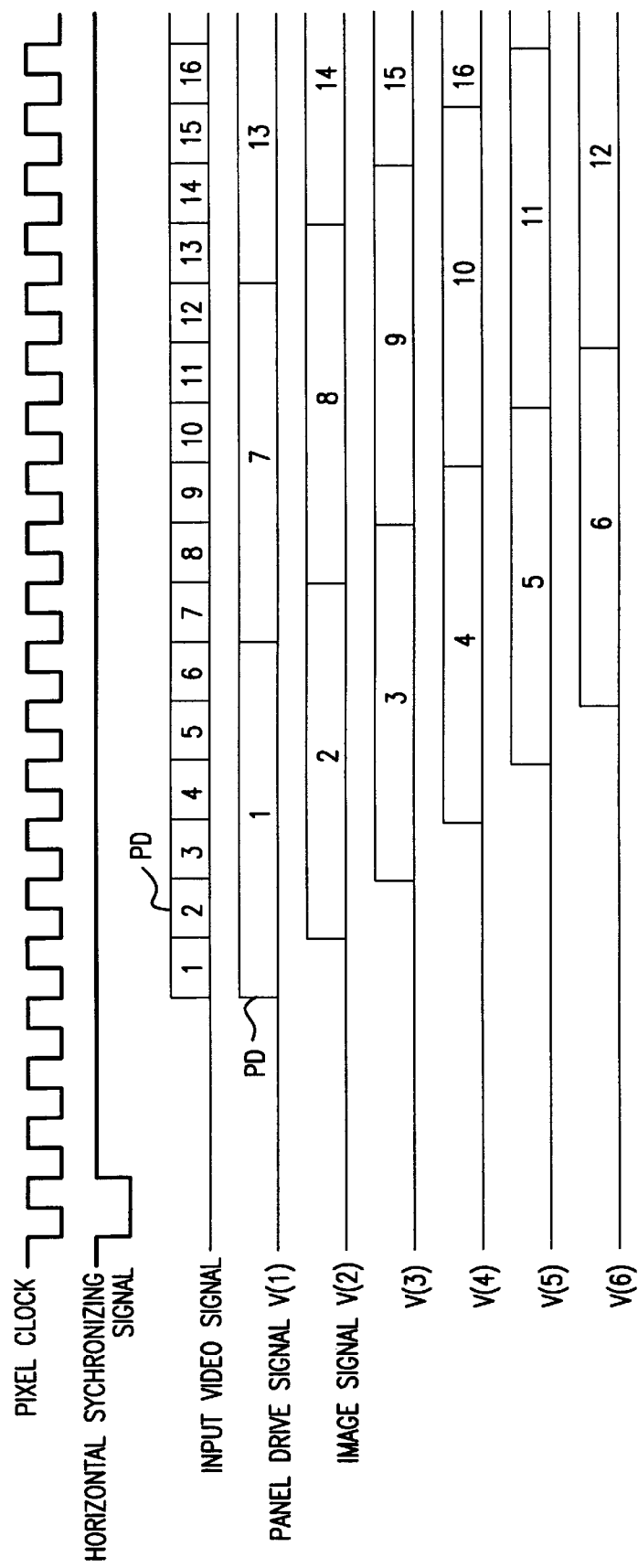
Figure 20:
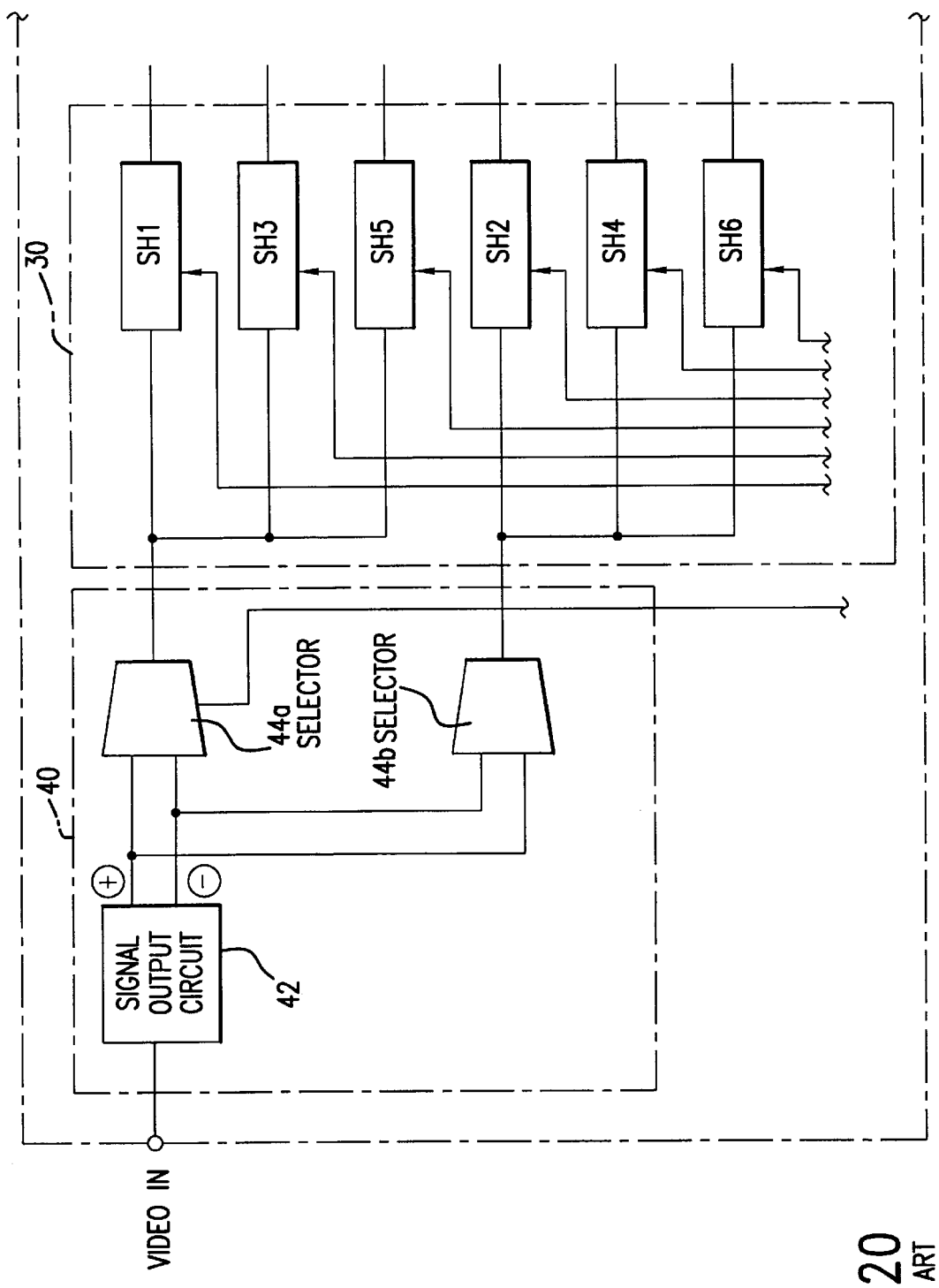
FIG. 20 is a block diagram of the video display apparatus of FIG. 19(A) provided with selectors for one dot polarity reversal driving.

Although the first embodiment has been discussed in connection with the video display apparatus which employs the liquid-crystal panel 110 as its display unit, the video display apparatus may instead incorporate a display unit of electroluminescence or CRT. A projection type video display apparatus may be built using the liquid-crystal panel 110 as a light valve. FIG. 18 generally shows a projection type video display apparatus (a projector) that employs a three-plate prism type optical system.

In FIG. 18, a projected light from a lamp unit 802 as a white light source is split into the three primary colors R, G and B through a plurality of mirrors 806, and two dichroic mirrors 810 and then guided to three TFT liquid-crystal panels 812R, 812G and 812B for presenting respective color images in a light guide 804 in a projector 800. Light rays modulated by the respective TFT liquid-crystal panels 812R, 812G, and 812B are directed to a dichroic prism 814 from three respective directions. The dichroic prism 814 permits R and B light rays to be bent at a 90° angle and G light rays to travel straight thereby combining these color images. The combined image is then projected to a screen through a projection lens 816. When video signals are supplied to the liquid-crystal panels 812R, 812G and 812B through any of data processing circuit blocks 300–700 with the phase expansion and rotation functions described above, a high quality and high resolution image free from horizontal crosstalk and vertical blurred line is presented. With the projector 800, a large, crisp image is projected on a screen.

The video display apparatuses in which the present invention may be embodied to include not only the above-described projector, but also car navigation devices, touch panel devices, POS terminal devices, video cameras with a monitor, video apparatuses, television sets, personal computers, wordprocessors, and portable telephones.

While the invention has been described in relation to preferred embodiments, many modifications and variations are apparent from the description of the invention, and all such modifications and variations are intended to be within the scope of the present invention as defined in the appended claims.

What is claimed is:

1. A gamma correction circuit that receives a video signal including a first polarity video signal and a second polarity video signal of different polarities with reference to a polarity reversal reference voltage between first and second black level voltages, the gamma correction circuit gamma corrects the first polarity video signal and the second polarity video signal, wherein the first polarity video signal has a first signal voltage varying between a first white level voltage and the first black level voltage that is lower than the first white level voltage, and wherein the second polarity video signal has a second signal voltage varying between the second black level voltage and a second white level voltage that is lower than the second black level voltage, the gamma correction circuit comprising:

a first amplifier device that amplifies the first signal voltage at a first amplification factor when the first signal voltage of the first polarity video signal is higher than a first reference voltage between the first black level voltage and the first white level voltage;

a second amplifier device that amplifies the first signal voltage at a second amplification factor that is greater than the first amplification factor when the first signal voltage of the first polarity video signal is lower than the first reference voltage;

a third amplifier device that amplifies the second signal voltage at a third amplification factor when the second signal voltage of the second polarity video signal is lower than a second reference voltage between the second black level voltage and the second white level voltage; and a fourth amplifier device that amplifies the second signal voltage at a fourth amplification factor that is smaller than the third amplification factor when the second signal voltage of the second polarity video signal is higher than the second reference voltage.

2. A gamma correction circuit that receives a video signal including a first polarity video signal and a second polarity video signal of different polarities with reference to a polarity reversal reference voltage between first and second black level voltages, the gamma correction circuit gamma corrects the first polarity video signal and the second polarity video signal, wherein the first polarity video signal has a first signal voltage varying between a first white level voltage and the first black level voltage, and the second polarity video signal has a second signal voltage varying between the second black level voltage and a second white level voltage, the gamma correction circuit comprising:

first voltage dividing means, including resistance elements of a first number, for voltage dividing a reference voltage by the resistance elements of the first number when the first signal voltage of the first polarity video signal is on one side of a first reference voltage between the first black level voltage and the first white level voltage, and for outputting an output voltage depending on the first signal voltage;

second voltage dividing means, including resistance elements of a second number greater than the first number, for voltage dividing the reference voltage by the resistance elements of the second number when the first signal voltage of the first polarity video signal is on the other side of the first reference voltage, and for outputting an output voltage depending on the first signal voltage;

third voltage dividing means, including resistance elements of a third number, for voltage dividing the reference voltage by the resistance elements of the third number when the second signal voltage of the second polarity video signal is on one side of a second reference voltage between the second black level voltage and the second white level voltage, and for outputting an output voltage depending on the second signal voltage; and fourth voltage dividing means, including resistance elements of a fourth number greater than the third number, for voltage dividing the reference voltage by the resistance elements of the fourth number when the second signal voltage of the second polarity video signal is on the other side of the second reference voltage, and for outputting an output voltage depending on the second signal voltage.

3. The gamma correction circuit of claim 2, wherein the resistance elements of the first number are the resistance elements of the third number.

4. A gamma correction circuit that receives a video signal including a first polarity video signal and a second polarity video signal of different polarities with reference to a polarity reversal reference voltage between first and second black level voltages, the gamma correction circuit gamma corrects the first polarity video signal and the second polarity video signal, the first polarity video signal has a first signal voltage varying between a first white level voltage and the first black level voltage, and wherein the second polarity video signal has a second signal voltage varying between the second black level voltage and a second white level voltage, the gamma correction circuit comprising:

a first terminal for applying a first voltage;

a second terminal for applying a second voltage lower than the first voltage;

a first resistance element and a second resistance element connected in series between the first terminal and the second terminal;

a third resistance element connected in parallel with the first resistance element and connected between the first terminal and the second resistance element;

a fourth resistance element connected in parallel with the second resistance element and connected between the second terminal and the third resistance element;

an output terminal connected to an intermediate node located between the first resistance element and the second resistance element;

first current control means for causing current to flow through the first and second resistance elements depending on the first signal voltage when the first signal voltage of the first polarity video signal is on one side of a first reference voltage between the first black level voltage and the first white level voltage, and for causing currents to flow through the first, second and third resistance elements when the first signal voltage of the first polarity video signal is on the other side of the first reference voltage; and second current control means for causing current to flow through the first and second resistance elements when the second signal voltage of the second polarity video signal is on one side of a second reference voltage between the second black level voltage and the second white level voltage, and for causing currents to flow through the first, second and fourth resistance elements when the second signal voltage of the second polarity video signal is on the other side of the second reference voltage.

5. The gamma correction circuit of claim 4, wherein the first current control means includes a transistor connected between the first terminal and the third resistance element.

6. The gamma correction circuit of claim 4, wherein the second current control means includes a transistor connected between the second terminal and the fourth resistance element.

7. A gamma correction circuit that receives a video signal including a first polarity video signal and a second polarity video signal of different polarities with reference to a polarity reversal reference voltage between first and second black level voltages, the gamma correction circuit gamma corrects the first polarity video signal and the second polarity video signal, the first polarity video signal has a first signal voltage varying between a first white level voltage and the first black level voltage, and the second polarity video signal has a second signal voltage varying between the second black level voltage and a second white level voltage, the gamma correction circuit comprising:

a first terminal for applying a first voltage;

a second terminal for applying a second voltage lower than the first voltage;

a first resistance element and a second resistance element connected in series between the first terminal and the second terminal;

a third resistance element connected in parallel with the first resistance element and connected between the first terminal and the second resistance element;

a fourth resistance element connected in parallel with the second resistance element and connected between the second terminal and the third resistance element;

an output terminal connected to an intermediate node located between the first resistance element and the second resistance element;

an input transistor connected between the first resistance element and the second resistance element, the input transistor having a first control terminal for receiving the video signal;

a first control transistor connected between the first terminal and the third resistance element, wherein the first control transistor is turned on when a first reference voltage between the first black level voltage and the first white level voltage is applied to a second control terminal with the first polarity video signal applied to the first control terminal, the first control transistor remaining turned off the rest of the time; and a second control transistor connected between the second terminal and the fourth resistance element, wherein the second control transistor is turned on when a second reference voltage between the second black level voltage and the second white level voltage is applied to a third control terminal with the second polarity video signal applied to the first control terminal, the second control transistor being off the rest of the time.

8. A video display apparatus having a video display unit comprising pixels arranged in a matrix and electrically connected to a plurality of data-signal lines and a plurality of scan-signal lines, and scan-signal line selecting means for applying a scan signal to the scan-signal lines, wherein each pixel is supplied with a difference voltage between a voltage applied to one end of the pixel through the data-signal line and a voltage applied to the other end of the pixel, and is driven with the direction of an electric field applied to the pixels, the video display apparatus comprising:

a polarity reversal circuit for receiving a video signal having a signal voltage between a black level voltage and a white level voltage, the polarity reversal circuit outputs a signal including a first polarity video signal that has a first signal voltage varying between a first white level voltage and a first black level voltage and a second polarity video signal that has a second signal voltage varying between a second black level voltage and a second white level voltage, wherein the first and second polarity video signals are different in polarity with respect to a polarity reversal reference voltage between the first and second black level voltages; and the gamma correction circuit according to claim 1 to which the output of the polarity reversal circuit is applied.

9. The video display apparatus according to claim 8, further comprising a clamp circuit for clamping the first black level voltage to a first clamp voltage when the first polarity video signal is input and for clamping the second black level voltage to a second clamp voltage when the second polarity video signal is input.

10. A video display apparatus having a video display unit comprising pixels arranged in a matrix and electrically connected to a plurality of data-signal lines and a plurality of scan-signal lines, and scan-signal line selecting means for applying a scan signal to the scan-signal lines, wherein each pixel is supplied with a difference voltage between a voltage applied to one end of the pixel through the data-signal line and a voltage applied to the other end of the pixel, and is driven with the direction of an electric field applied to the pixels, the video display apparatus comprising:

a polarity reversal circuit for receiving a video signal having a signal voltage between a black level voltage and a white level voltage, the polarity reversal circuit outputs a signal including a first polarity video signal that has a first signal voltage varying between a first white level voltage and a first black level voltage and a second polarity video signal that has a second signal voltage varying between a second black level voltage and a second white level voltage, wherein the first and second polarity video signals are different in polarity with respect to a polarity reversal reference voltage between the first and second black level voltages; and the gamma correction circuit according to claim 2 to which the output of the polarity reversal circuit is applied.

11. The video display apparatus according to claim 10, further comprising a clamp circuit for clamping the first black level voltage to a first clamp voltage when the first polarity video signal is input and for clamping the second black level voltage to a second clamp voltage when the second polarity video signal is input.

12. A video display apparatus having a video display unit comprising pixels arranged in a matrix and electrically connected to a plurality of data-signal lines and a plurality of scan-signal lines, and scan-signal line selecting means for applying a scan signal to the scan-signal lines, wherein each pixel is supplied with a difference voltage between a voltage applied to one end of the pixel through the data-signal line and a voltage applied to the other end of the pixel, and is driven with the direction of an electric field applied to the pixels, the video display apparatus comprising:

a polarity reversal circuit for receiving a video signal having a signal voltage between a black level voltage and a white level voltage, the polarity reversal circuit outputs a signal including a first polarity video signal that has a first signal voltage varying between a first white level voltage and a first black level voltage and a second polarity video signal that has a second signal voltage varying between a second black level voltage and a second white level voltage, wherein the first and second polarity video signals are different in polarity with respect to a polarity reversal reference voltage between the first and second black level voltages; and the gamma correction circuit according to claim 4 to which the output of the polarity reversal circuit is applied.

13. The video display apparatus according to claim 12, further comprising a clamp circuit for clamping the first black level voltage to a first clamp voltage when the first polarity video signal is input and for clamping the second black level voltage to a second clamp voltage when the second polarity video signal is input.

14. A video display apparatus having a video display unit comprising pixels arranged in a matrix and electrically connected to a plurality of data-signal lines and a plurality of scan-signal lines, and scan-signal line selecting means for applying a scan signal to the scan-signal lines, wherein each pixel is supplied with a difference voltage between a voltage applied to one end of the pixel through the data-signal line and a voltage applied to the other end of the pixel, and is driven with the direction of an electric field applied to the pixels alternated, the video display apparatus comprising:

a polarity reversal circuit for receiving a video signal having a signal voltage between a black level voltage and a white level voltage, the polarity reversal circuit outputs a signal including a first polarity video signal that has a first signal voltage varying between a first white level voltage and a first black level voltage and a second polarity video signal that has a second signal voltage varying between a second black level voltage and a second white level voltage, wherein the first and second polarity video signals are different in polarity with respect to a polarity reversal reference voltage between the first and second black level voltages; and the gamma correction circuit according to claim 7 to which the output of the polarity reversal circuit is applied.

15. The video display apparatus according to claim 14, further comprising a clamp circuit for clamping the first black level voltage to a first clamp voltage when the first polarity video signal is input and for clamping the second black level voltage to a second clamp voltage when the second polarity video signal is input.

* * * * *